(12) United States Patent
Chapman et al.

(10) Patent No.: US 11,468,492 B2
(45) Date of Patent: *Oct. 11, 2022

(54) DECENTRALIZED RECOMMENDATIONS USING DISTRIBUTED AVERAGE CONSENSUS

(71) Applicant: Hypernet Labs, Inc., Redwood City, CA (US)

(72) Inventors: Todd Allen Chapman, Stanford, CA (US); Ivan James Ravlich, Los Altos, CA (US); Christopher Taylor Hansen, Sunnyvale, CA (US); Daniel Maren, Los Altos, CA (US)

(73) Assignee: Hypernet Labs, Inc., Redwood City, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/953,208

(22) Filed: Nov. 19, 2020

(65) Prior Publication Data
US 2021/0082025 A1    Mar. 18, 2021

Related U.S. Application Data

(63) Continuation of application No. 16/252,459, filed on Jan. 18, 2019, now Pat. No. 10,878,482.
(Continued)

(51) Int. Cl.
*G06Q 30/00*    (2012.01)
*G06Q 30/06*    (2012.01)
(Continued)

(52) U.S. Cl.
CPC ..... *G06Q 30/0631* (2013.01); *G06F 16/9535* (2019.01); *G06N 7/005* (2013.01);
(Continued)

(58) Field of Classification Search
CPC ..................................................... G06Q 30/00
See application file for complete search history.

(56) References Cited

U.S. PATENT DOCUMENTS 9,646,029 B1   5/2017   Baird
9,817,701 B2   11/2017  Baptist et al.
(Continued)

FOREIGN PATENT DOCUMENTS

CN    113449839 A   9/2021

OTHER PUBLICATIONS

Cheng-Kui-Huang, Tony "Recommendations of closed consensus temporal patterns by group decision making", Knowledge-Based Systems, dated Dec. 2013. (Year: 2013).*
(Continued)

*Primary Examiner* — Mark A Fadok
(74) *Attorney, Agent, or Firm* — Fenwick & West LLP

(57) ABSTRACT

A distributed computing device stores user preference data representing preferences of a user with respect to a portion of a set of items. The distributed computing device randomly samples the user preference data to calculate sampled user preference data. The distributed computing device iteratively executes, in conjunction with additional distributed computing devices connected by a network, a process to determine a consensus result for the sampled user preference data. The consensus result is based on the sampled user preference data and additional sampled user preference data calculated by the additional distributed computing devices and based on preferences of additional users. The distributed computing device determines a recommendation model based on the consensus result, the recommendation model reflecting preferences of the user and additional users. The distributed computing device identifies an item to provide to (Continued)

1300 the user as a recommendation based on the recommendation model, and provides recommendation to the user.

20 Claims, 11 Drawing Sheets

Related U.S. Application Data

(60) Provisional application No. 62/619,715, filed on Jan. 19, 2018, provisional application No. 62/619,719, filed on Jan. 19, 2018, provisional application No. 62/662,059, filed on Apr. 24, 2018, provisional application No. 62/700,153, filed on Jul. 18, 2018, provisional application No. 62/727,355, filed on Sep. 5, 2018.

(51) Int. Cl.
| | |
|---|---|
| *G06Q 30/02* | (2012.01) |
| *G06N 20/00* | (2019.01) |
| *G06F 16/9535* | (2019.01) |
| *G06N 7/00* | (2006.01) |
| *H04L 67/104* | (2022.01) |
| *H04L 65/40* | (2022.01) |

(52) U.S. Cl.
CPC ......... *G06N 20/00* (2019.01); *G06Q 30/0255* (2013.01); *H04L 65/40* (2013.01); *H04L 67/104* (2013.01)

(56) References Cited

U.S. PATENT DOCUMENTS

| | | | |
|---|---|---|---|
| 9,858,052 | B2 | 1/2018 | Bornstein et al. |
| 10,152,676 | B1 | 12/2018 | Strom |
| 10,645,024 | B2 | 5/2020 | Quirk et al. |
| 11,244,243 | B2 * | 2/2022 | Chapman ................. G06N 5/04 |
| 2002/0147628 | A1 | 10/2002 | Specter et al. |
| 2006/0020662 | A1 | 1/2006 | Robinson |
| 2007/0118518 | A1 | 5/2007 | Wu et al. |
| 2010/0161596 | A1 | 6/2010 | Yan et al. |
| 2010/0169340 | A1 | 7/2010 | Kenedy et al. |
| 2011/0106743 | A1 | 5/2011 | Duchon |
| 2012/0331025 | A1 | 12/2012 | Gemulla et al. |
| 2013/0132392 | A1 | 5/2013 | Kenedy et al. |
| 2013/0151927 | A1 | 6/2013 | Leggette et al. |
| 2014/0025216 | A1 | 1/2014 | Husen et al. |
| 2014/0074269 | A1 | 3/2014 | Weston et al. |
| 2014/0279727 | A1 | 9/2014 | Baraniuk et al. |
| 2014/0282244 | A1 | 9/2014 | Speer et al. |
| 2015/0254328 | A1 | 9/2015 | Dereszynski et al. |
| 2015/0256897 | A1 | 9/2015 | Van Stam |
| 2015/0278200 | A1 | 10/2015 | He et al. |
| 2015/0312335 | A1 | 10/2015 | Ying et al. |
| 2016/0036925 | A1 | 2/2016 | Quirk et al. |
| 2016/0103901 | A1 | 4/2016 | Kadav et al. |
| 2016/0154798 | A1 | 6/2016 | Davis et al. |
| 2016/0155067 | A1 | 6/2016 | Dubnov et al. |
| 2016/0248631 | A1 | 8/2016 | Duchesneau |
| 2016/0328253 | A1 | 11/2016 | Majumdar |
| 2017/0103468 | A1 | 4/2017 | Orsini et al. |
| 2017/0109322 | A1 | 4/2017 | McMahan et al. |
| 2017/0132630 | A1 | 5/2017 | Castinado et al. |
| 2017/0140262 | A1 | 5/2017 | Wilson et al. |
| 2017/0171580 | A1 | 6/2017 | Hirsch et al. |
| 2017/0173262 | A1 | 6/2017 | Veltz |
| 2017/0185672 | A1 | 6/2017 | Yu et al. |
| 2017/0228645 | A1 | 8/2017 | Wang et al. |
| 2017/0235848 | A1 * | 8/2017 | Van Dusen ............ G06N 20/00 705/12 |
| 2017/0331696 | A1 | 11/2017 | Gupta et al. |
| 2018/0144242 | A1 | 5/2018 | Simard |
| 2018/0150299 | A1 | 5/2018 | Balle et al. |
| 2018/0157992 | A1 | 6/2018 | Susskind et al. |
| 2018/0253817 | A1 | 9/2018 | John |
| 2018/0260703 | A1 | 9/2018 | Soljacic et al. |
| 2018/0300315 | A1 | 10/2018 | Leal et al. |
| 2018/0307986 | A1 | 10/2018 | Kabul et al. |
| 2018/0314735 | A1 | 11/2018 | Liu et al. |
| 2018/0336484 | A1 | 11/2018 | Hunt et al. |
| 2019/0050727 | A1 | 2/2019 | Anderson et al. |
| 2019/0138934 | A1 | 5/2019 | Prakash et al. |
| 2019/0163985 | A1 * | 5/2019 | Wang ................. G06Q 30/0631 |
| 2019/0287022 | A1 | 9/2019 | Zhang et al. |
| 2020/0175370 | A1 | 6/2020 | Zhang et al. |
| 2020/0380340 | A1 | 12/2020 | Blanchard et al. |

OTHER PUBLICATIONS

Baraglia, R. et al, "A peer-to-peer recommender system for self-emerging user communications based on gossip overlays," *Journal of Computer and System Sciences*, vol. 79, 2013, pp. 291-308.

PCT International Search Report and Written Opinion, PCT Application No. PCT/US2019/014351, dated May 24, 2019, 16 pages.

PCT Invitation to Pay Additional Fees And, Where Applicable, Protest Fee, PCT Application No. PCT/US19/014351, Mar. 27, 2019, 2 pages.

Souptik, D. et al., "Uniform Data Sampling from a Peer-to-Peer Network," 27th International Conference on Distributed Computing Systems, Jun. 2007, 9 pages.

Wissman, B., "Peer-to-Peer is the Next Wave of Influencer Marketing," obtained online on Sep. 9, 2020 from https://www.entrepeneur.com/article/334472, dated Jun. 20, 2019, 14 pages.

Xiao, L. et al., "Distributed average consensus with least-mean-square deviation," *Journal of Parallel and Distributed Computing*, 2007, vol. 67, pp. 33-46.

Bijral et al. "Data-Dependent Bounds on Network Gradient Descent," Fifty-fourth Annual Allerton Conference Allerton House, UIUC, Illinois, USA Sep. 27-30, 2016, pp. 869-874.

Sirb et al., "Decentralized Consensus Algorithm with Delayed and Stochastic Gradients," arXiv: 1604.05649v3 [math.OC] Jan. 16, 2018, pp. 1-26.

Tsianos et al., Consensus-Based Distributed Optimization: Practical Issues and Applications in Large-Scale Machine Learning, Fiftieth Annual Allerton Conference Allerton House, UIUC, Illinois, USA Oct. 1-5, 2012, pp. 1543-1550.

* cited by examiner

DECENTRALIZED RECOMMENDATIONS USING DISTRIBUTED AVERAGE CONSENSUS

CROSS REFERENCE TO RELATED APPLICATIONS

This application is a continuation of U.S. application Ser. No. 16/252,459, filed Jan. 18, 2019, which claims the benefit of U.S. Provisional Application No. 62/619,715, filed Jan. 19, 2018; U.S. Provisional Application No. 62/619,719, filed Jan. 19, 2018; U.S. Provisional Application No. 62/662,059, filed Apr. 24, 2018; U.S. Provisional Application No. 62/700,153, filed Jul. 18, 2018; and U.S. Provisional Application No. 62/727,355, filed Sep. 5, 2018, each of which is incorporated by reference in its entirety.

BACKGROUND

Convergence in Distributed Computing

Distributed computing can be used to break a large computation into sub-components, assign distributed computing devices components of the computation, and combine the results from the distributed computing devices to generate the result of the computation. Existing methods for distributed computing use various techniques to obtain a result from a distributed computing task, e.g., selecting a coordinator to evaluate the sub-component results, or determining a majority result. Typical distributed computing operations are designed to be fault-tolerant, which allows convergence even if a computing device was not able to perform its assigned portion of the computation. However, such operations also allow a computing device that claims to contribute to the computation, but did not contribute, to converge with the other computing devices. Thus, in a typical distributed computing operation, the convergence result will not indicate if any computing devices did not participate in calculating the result. This is problematic in situations where computing devices receive compensation for their work, because a computing device may be able to receive compensation without performing any work.

Updating AI Models

One use for distributed computing devices relates to improving artificial intelligence (AI) models. Distributed computers connected to a network can implement an AI model and also collect data that is used to update and improve the AI model. In current systems for improving AI models using data collected by the distributed computers, a "gather and scatter" method is used to generate and propagate updates to the AI models determined from the collected data. In the gather and scatter method, distributed computers collect data and transmit the data to a central server. The central server updates the AI model and transmits the updated AI model to the distributed computers. The central server must be reliable, and each distributed computer must have a reliable connection to the server to provide data to and receive model updates from the central server. This gather and scatter method requires a large amount of computing to be performed at the central server, and does not take advantage of the computing resources of the distributed computers.

Personalized Recommendations

In conventional systems for generating personalized recommendations, a centralized system obtains user preference data and generates recommendations based on the obtained data. For example, the centralized system may collect data describing users' prior purchases and product ratings, or data tracking user behavior, such as clickstream data. The centralized system uses this collected data to provide personalized recommendations to users. However, such centralized systems may often also exploit users' personal data for other purposes, such as targeting content towards them or selling the data to third parties. Many users would prefer to receive personalized recommendations without having a centralized system collect, store, or distribute their personal data.

SUMMARY

Systems and methods for performing computations in a distributed environment are described herein. To perform a computation in the distributed environment, different portions of the computation are assigned to different computing devices, and the results of the portions are combined to determine the computation result. The computation is portioned in such a way that the computing devices can exchange their portioned results in a peer-to-peer fashion, and perform a consensus algorithm that both (1) obtains the final computation result and (2) confirms that all of the contributing devices have performed their assigned portion of the computation. In particular, the computing devices perform a distributed average consensus (DAC) algorithm in which the computing devices repeatedly form connections, exchange data, and calculate an average of the exchanged data, which is used as the data to exchange in a subsequent step. When this procedure leads to a consensus (e.g., the averages across all computing devices settle around a consensus average value), the result of the DAC algorithm indicates whether each computing device has contributed to the calculation of the average. Thus, the DAC procedure is able to confirm that each computing device in the distributed environment has contributed to the calculation. The DAC procedure confirms that each computing device has participated using the same connections that are used to obtain the consensus result; thus, no additional routing protocols or overlay topologies are needed to confirm participation.

In addition to the DAC environment and algorithm, several exemplary applications for DAC are described herein. One application involves cooperatively generating a recommendation model and generating personalized recommendations based on the model without exposing personal user data. To generate the recommendation model, cooperating distributed computing devices use a cooperative subspace approach that combines the DAC algorithm with the theory of random sampling. Each distributed computing device randomly samples local user preference data in a cooperative subspace that approximates the user preference data reflecting the users of all cooperating distributed computing devices. The sampled preference data is shared among the cooperating distributed computing devices. The distributed computing devices use the DAC algorithm to cooperatively create a recommendation model based on the sampled preference data of many users. Each distributed computing device individually applies the recommendation model to the distributed computing device's local preference data to generate personalized recommendations for the user of the distributed computing device. The cooperative subspace approach allows the DAC algorithm to be performed efficiently, and the random sampling obscures the underlying user preference data so that users' data privacy is maintained.

In one embodiment, a method for generating personalized recommendations is described. A distributed computing device stores user preference data representing preferences of a user with respect to a portion of a set of items. The distributed computing device calculates sampled user preference data by randomly sampling the user preference data. The distributed computing device iteratively executes, in conjunction with a plurality of additional distributed computing devices connected to the distributed computing device by a network, a process to determine a consensus result for the sampled user preference data. The consensus result is based on the sampled user preference data calculated by the distributed computing device and additional sampled user preference data calculated by the plurality of additional distributed computing devices. The additional sampled user preference data is based on preferences of a plurality of additional users. The distributed computing device determines a recommendation model based on the consensus result for the sampled user preference data. The recommendation model reflects the preferences of the user and the plurality of additional users. The distributed computing device identifies an item of the set of items to provide to the user as a recommendation based on the recommendation model, and provides the recommendation of the item to the user.

DETAILED DESCRIPTION

Figure 1:
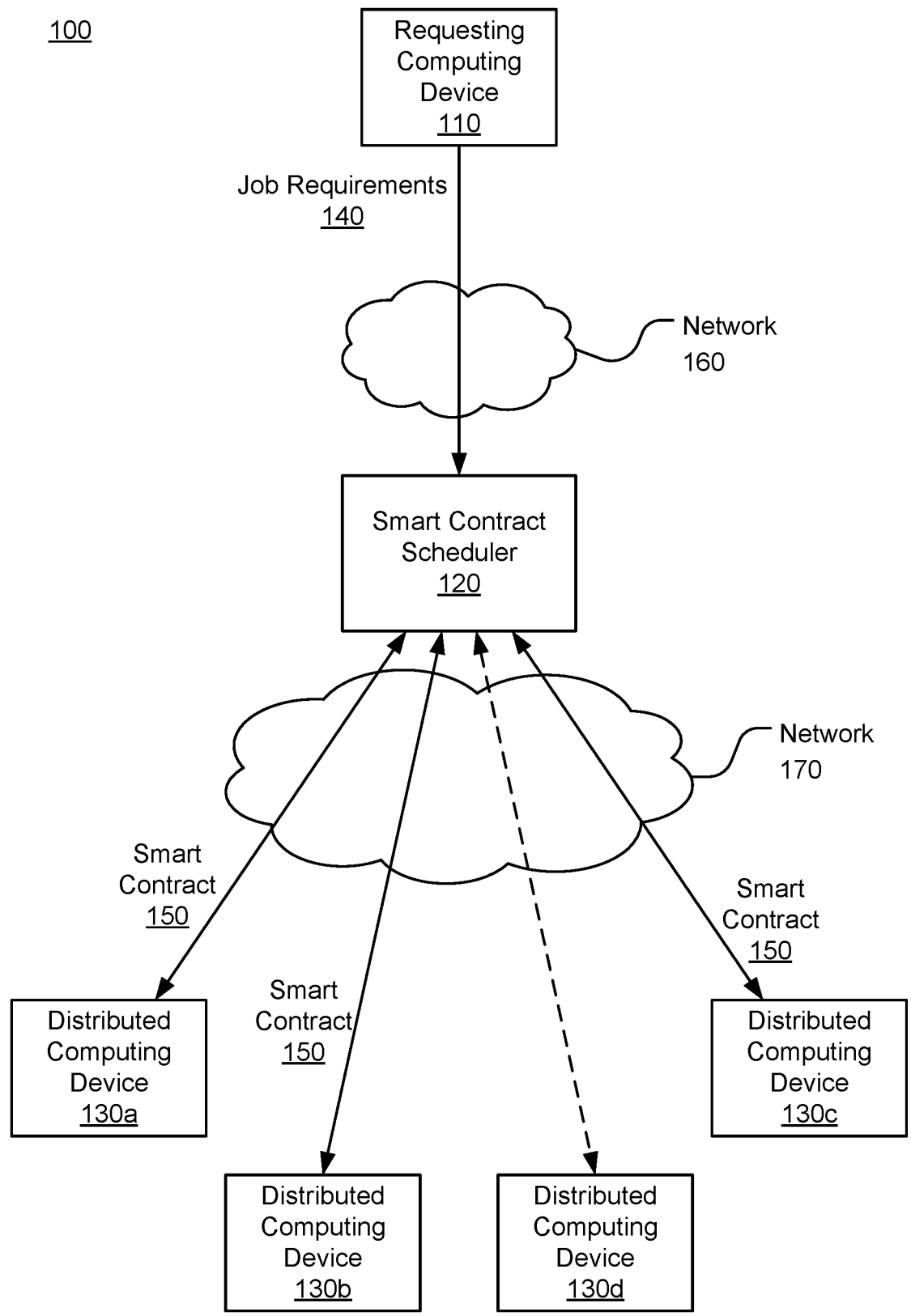
FIG. 1 is a flow diagram showing contract formation in an environment for distributed computing, according to one embodiment.

The Figures (FIGs.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

It is noted that wherever practicable similar or like reference numbers may be used in the figures and may indicate similar or like functionality. A letter after a reference numeral, such as "130a," indicates that the text refers specifically to the element having that particular reference numeral. A reference numeral in the text without a following letter, such as "130," refers to any or all of the elements in the figures bearing that reference numeral. For example, "130" in the text refers to reference numerals "130a" and/or "130b" and/or "130c" in the figures.

Distributed Average Consensus (DAC) Environment

The DAC algorithm can be implemented in a two-sided market that includes requesting computing devices seeking computing power and distributed computing devices that provide computing power. The requesting computing devices, or users of the requesting computing devices, want to run a computing task on the distributed computing devices. The requesting computing devices may be used by scientists, statisticians, engineers, financial analysts, etc. The requesting computing device can transmit requests to one or more intermediary computing devices, which coordinate the fulfillment of the request with a set of distributed computing devices. The requesting computing devices request compute time on the distributed computing devices, and may provide compensation to the distributed computing devices in exchange for compute time. The arrangement between a requesting computing device and a set of distributed computing devices can be represented by a smart contract. A smart contract is an agreement made between multiple computing devices (e.g., a set of distributed computing devices, or a requesting computing device and a set of distributed computing devices) to commit computing resources to a computing task. A smart contract specifies a set of technical requirements for completing the computing task, and may specify compensation for completing the computing task or a portion of the computing task. The smart contract may include a list of distributed computing devices that have agreed to the smart contract. In some embodiments, smart contracts are published to a blockchain.

The requesting computing devices, intermediary computing devices, and distributed computing devices are computing devices capable of transmitting and receiving data via a network. Any of the computing devices described herein may be a conventional computer system, such as a desktop computer or a laptop computer. Alternatively, a computing device may be any device having computer functionality, such as a mobile computing device, server, tablet, smartphones, smart appliance, personal digital assistant (PDA), etc. The computing devices are configured to communicate via a network, which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP).

FIG. 1 illustrates contract formation in an exemplary environment 100 for distributed computing. In the example shown in FIG. 1, a requesting computing device 110 communicates over a network 160 with a smart contract scheduler 120, which is an intermediary computing device that coordinates computing resources for performing distributed computing tasks. The environment 100 also includes a set of distributed computing devices 130 that can connect to each other and to the smart contract scheduler 120 over a network 170. The networks 160 and 170 may be the same network, e.g., the Internet, or they may be different networks. FIG. 1 shows four distributed computing devices 130a, 130b, 130c, and 130d, but it should be understood that the environment 100 can include many more distributed computing devices, e.g., millions of distributed computing devices 130. Similarly, the environment 100 can include additional requesting computing devices 110 and smart contract schedulers 120. While the requesting computing device 110, smart contract scheduler 120, and distributed computing devices 130 are shown as separate computing devices, in other embodiments, some of the components in the environment 100 may be combined as a single physical computing device. For example, the requesting computing device 110 may include a smart contract scheduling component. As another example, the requesting computing device 110 and/or smart contract scheduler 120 are also distributed computing devices 130 with computing resources for performing requested calculations.

To request computation of a given computing task, the requesting computing device 110 transmits a set of job requirements 140 to the smart contract scheduler 120 over the network 160. The job requirements 140 may include, for example, minimum technical requirements for performing the task or a portion of the task, such as memory, disk space, number of processors, or network bandwidth. The job requirements 140 also include an amount and/or type of compensation offered by the requesting computing device 110 for the task or a portion of the task.

The smart contract scheduler 120 generates a smart contract 150 for the requesting computing device 110 based on the job requirements 140 and transmits the smart contract 150 to the distributed computing devices 130 over the network 170. The smart contract scheduler 120 may broadcast the smart contract 150 to all participating distributed computing devices 130, or transmit the smart contract 150 to some subset of the distributed computing devices 130. For example, the smart contract scheduler 120 may maintain a list of distributed computing devices 130 and their technical specifications, and identify a subset of the distributed computing devices 130 that meet one or more technical requirements provided in the job requirements 140. As another example, the smart contract scheduler 120 may determine, based on prior smart contracts, distributed computing devices 130 that are currently engaged with tasks for other smart contracts, and identify a subset of the distributed computing devices 130 that may be available for the smart contract 150.

Each distributed computing device 130 that receives the smart contract 150 from the smart contract scheduler 120 can independently determine whether the technical requirements and compensation are suitable. At least some portion of distributed computing devices 130 agree to the smart contract 150 and transmit their acceptance of the contract to the smart contract scheduler 120 over the network 170. In the example shown in FIG. 1, distributed computing devices 130a, 130b, and 130c agree to the smart contract 150, and distributed computing device 130d has not agreed to the smart contract. The distributed computing devices 130a-130c that agree to the smart contract 150 may each publish a signed copy of the smart contract 150 to a blockchain in which the distributed computing devices 130 and the smart contract scheduler 120 participate. Contracts published to the blockchain can be received by all participants, including the smart contract scheduler 120 and, in some embodiments, the requesting computing device 110.

While three distributed computing devices 130a-130c are shown as signing the smart contract 150 in FIG. 1, it should be understood that additional distributed computing devices 130 (e.g., tens of computing devices, thousands of computing devices, etc.) can sign a single smart contract and participate in the computing task. In some embodiments, the smart contract 150 specifies a requisite number of distributed computing devices 130 for performing the computing task. Once the requisite number of distributed computing devices publish their acceptance of the smart contract 150 to the blockchain, the distributed computing devices that have committed to the contract complete the computing task.

Once the distributed computing devices 130 have agreed to cooperate on the task, the distributed computing devices receive code provided by the requesting computing device 110 with instructions for completing the computing task. The requesting computing device 110 may transmit the code directly to the distributed computing devices 130a-130c over the network 170, or the requesting computing device 110 may provide the code to the distributed computing devices 130a-130c via the smart contract scheduler 120. In some embodiments, the code include checkpoints, which are used to indicate suitable restart locations for long-running calculations. In a long calculation, the code may fail before completion of a task, but after a distributed computing device 130 has performed a substantial amount of work. When a distributed computing device 130 successfully reach a specified checkpoint, the distributed computing device 130 is compensated for the work it has done up to that checkpoint.

In some embodiments, the distributed computing devices 130 cooperate for computing tasks that benefit the distributed computing devices 130 themselves, rather than for the benefit of a particular requesting computing device 110. For example, the distributed computing devices 130 may perform a DAC procedure for cooperative learning, such as decentralized Bayesian parameter learning or neural network training, described in further detail below. In such embodiments, a distributed computing device 130 may not receive compensation from a requesting computing device, but instead receives the benefit of data and cooperation from the other distributed computing devices 130. The distributed computing devices 130 may sign a smart contract 150 with each other, rather than with a requesting computing device 110 outside of the group of distributed computing devices 130. Alternatively, the distributed computing devices 130 may cooperate on computing tasks without a smart contract 150. The distributed computing devices 130 may receive code for performing the calculations from a coordinating computing device, which may be one of the distributed computing devices 130 or another computing device.

The distributed computing devices 130 provide connection information to the other distributed computing devices 130 so that they are able to communicate their results to each other over the network 170. For example, the smart contract 150 may be implemented by a blockchain accessed by each of the distributed computing devices 130 and on which each distributed computing device 130 publishes connection information.

Figure 2:
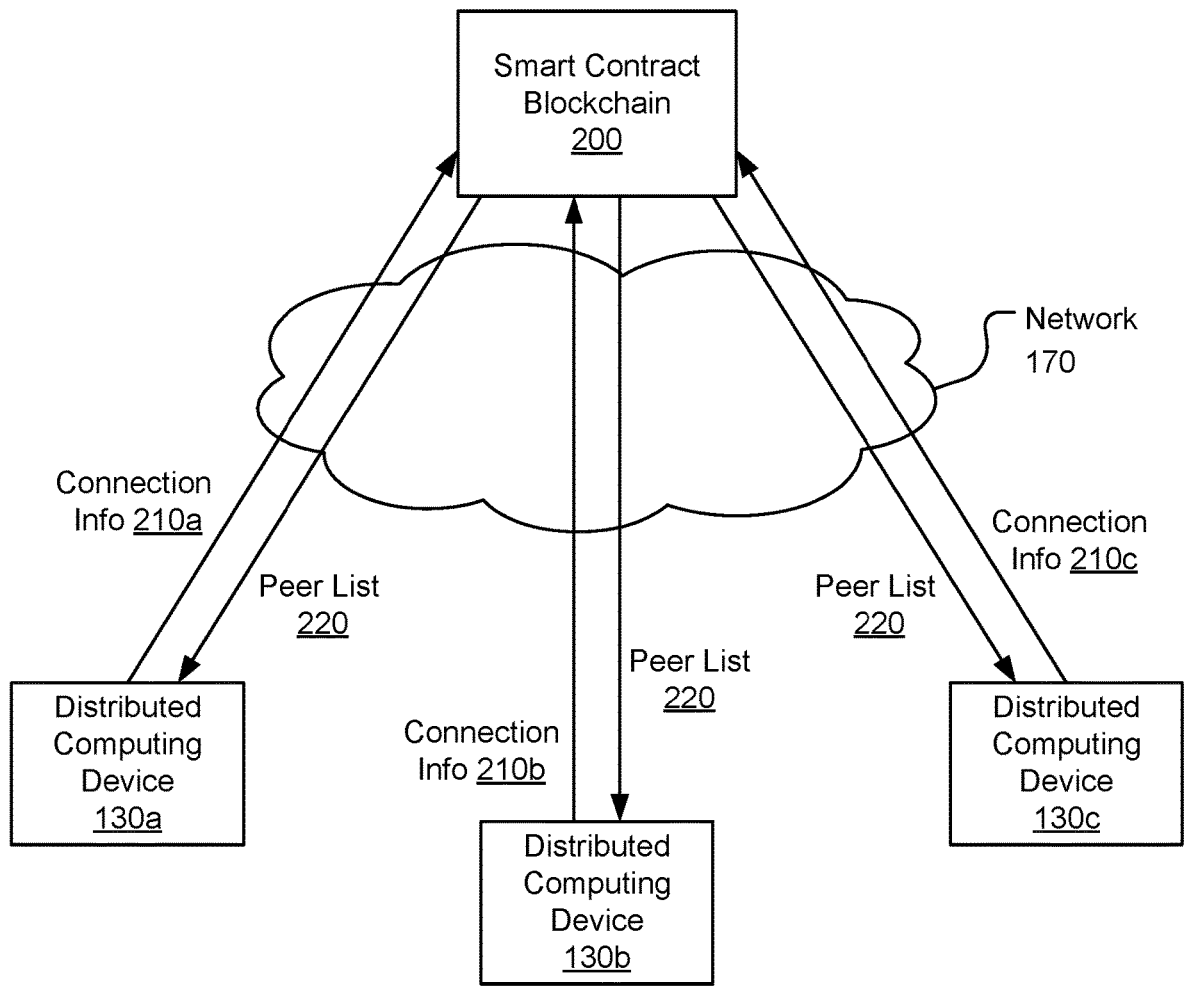
FIG. 2 is a flow diagram showing publishing of distributed computing device information in the environment of for distributed computing, according to one embodiment.

FIG. 2 is a flow diagram showing publishing of distributed computing device information in the environment for distributed computing shown in FIG. 1. The distributed computing devices 130a, 130b, and 130c that have signed the smart contract 150 each publish their respective connection information 210a, 210b, and 210c to a smart contract blockchain 200 over the network 170. Information published to the smart contract blockchain 200 is received by each of the distributed computing devices 130a-130c over the network 170. The connection information 210 can be, for example, the IP address of the distributed computing device 130 and the port on which the distributed computing device 130 wishes to receive communications from the other distributed computing devices. The distributed computing devices 130 each compile a peer list 220 based on the information published to the smart contract blockchain 200. The peer list 220 includes the connection information 210 for some or all of the distributed computing devices 130 that signed the smart contract 150. The peer list 220 allows each distributed computing device 130 to communicate with at least a portion of the other distributed computing devices over the network 170. Each distributed computing device 130 stores a local copy of the peer list 220. If the peer list 220 includes a portion of the distributed computing devices 130 that signed the smart contract 150, the peer lists 220 stored on different distributed computing devices 130 are different, e.g., each distributed computing device 130 may store a unique peer list containing some portion of the distributed computing devices 130 that signed the smart contract 150.

Figure 3:
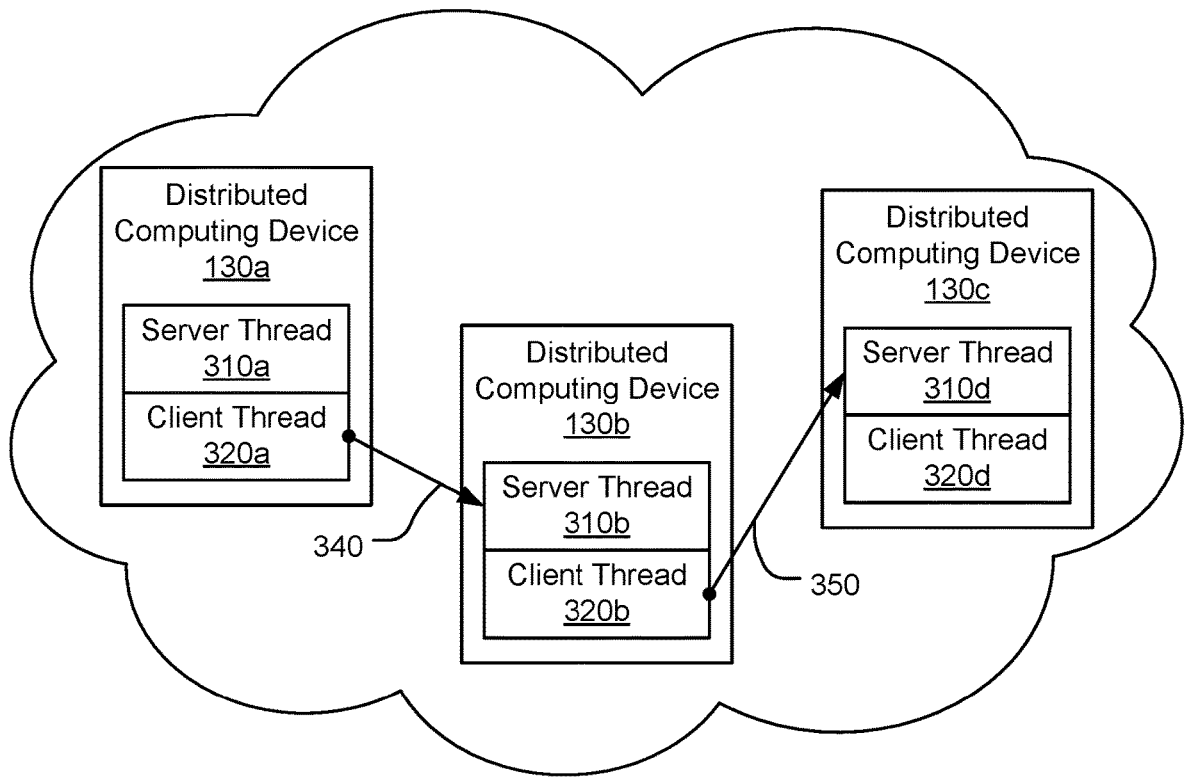
FIG. 3 is a block diagram showing peer-to-peer connections between distributed computing devices, according to one embodiment.

FIG. 3 illustrates peer-to-peer connections formed between distributed computing devices according to the peer list 220. After each distributed computing device 130 has performed its portion of the computation, the distributed computing devices 130 connect to each other (e.g., over the network 170 shown in FIGS. 1 and 2) to share results. To form the connections, each distributed computing device 130 initializes a server thread 310 to listen to the port that it posted to the smart contract blockchain 200, i.e., the port it provided in the connection information 210. Each distributed computing device 130 also initializes a client thread 320 capable of connecting to another distributed computing device 130. In the example shown in FIG. 3, the client thread 320a of distributed computing device 130a has formed a connection 340 to the server thread 310b of distributed computing device 130b using the connection information 210b provided by distributed computing device 130b. In addition, the client thread 320b of distributed computing device 130b has formed a connection 350 to the server thread 310c of distributed computing device 130c using the connection information 210c provided by distributed computing device 130c. Distributed computing devices 130a and 130b can share computing results over the connection 340, and distributed computing devices 130b and 130c can share computing results over the connection 350.

While three distributed computing devices 130 that signed the smart contract 150 are illustrated in FIGS. 1-3, in many cases, more distributed computing devices are involved in a computing task. According to the DAC protocol, the distributed computing devices 130 undertake a sequence of forming connections, sharing results, computing an average, and determining whether consensus is reached. If consensus has not been reached, the distributed computing devices 130 form a new set of connections, share current results (i.e., the most recently computed averages), compute a new average, and again determine whether consensus is reached. This process continues iteratively until consensus is reached. A mathematical discussion of the DAC algorithm is described in greater detail below.

Figure 4A:
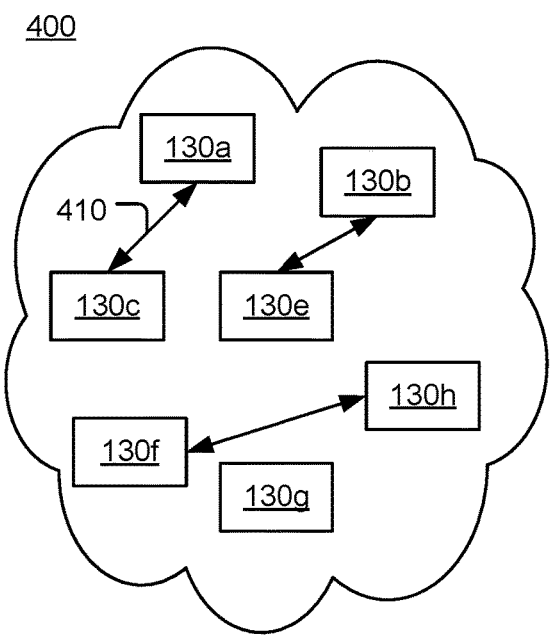
FIG. 4A is a diagram showing a first arrangement of peer connections among a group of distributed computing devices at a first time, according to one embodiment.

FIG. 4A illustrates a first arrangement 400 of peer connections formed among a group of seven distributed computing devices at a first time, according to one embodiment. FIG. 4A includes a set of seven distributed computing devices 130a-130g that have connected to form three sets of pairs. For example, distributed computing device 130a is connected to distributed computing device 130c over connection 410. The distributed computing devices 130, or some portion of the distributed computing devices 130, may each select a random computing device from the pair list 220 and attempt to form a peer-to-peer connection. In the example shown in FIG. 4A, distributed computing device 130g has not formed a connection to any other distributed computing device in this iteration. In some embodiments, a single distributed computing device 130 may be connected to two other distributed computing devices, e.g., both the client thread and the server thread are connected to a respective computing device.

Figure 4B:
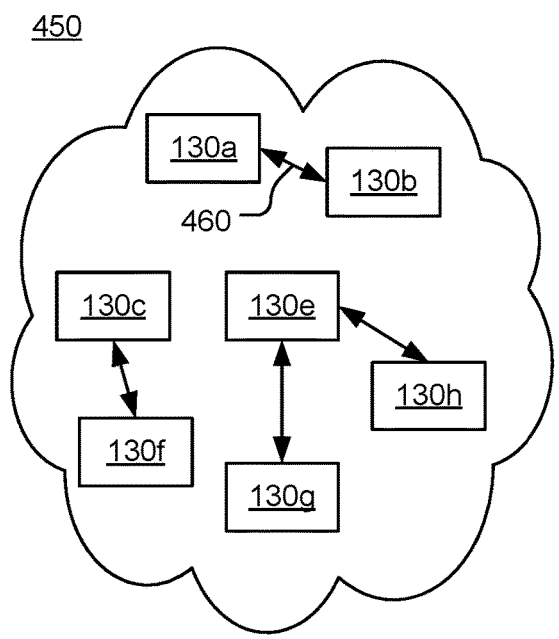
FIG. 4B is a diagram showing a second arrangement of peer-to-peer connections among the group of distributed computing devices at a second time, according to one embodiment.

FIG. 4B illustrates a second arrangement 450 of peer-to-peer connections among the group of distributed computing devices 130a-130g at a second time, according to one embodiment. The distributed computing devices 130a-130g have formed the connections in a different configuration from the connections 400 shown in FIG. 4A. For example, distributed computing device 130a is now connected to distributed computing device 130b over connection 460. The distributed computing devices 130a-130g continue to form new sets of connections and exchange data until they determine that distributed average consensus is reached.

In some embodiments, process replication is used to ensure that the loss of a distributed computing device 130 does not compromise the results of an entire computation task. Process replication provides a safeguard to the inherently unreliable nature of dynamic networks, and offers a mechanism for distributed computing devices 130 to check that peers computing devices 130 are indeed contributing to the calculation in which they are participating. In such embodiments, distributed computing devices 130 can be arranged into groups that are assigned the same data. When a group of distributed computing devices 130 assigned the same data reach a checkpoint, each computing device in the group of distributed computing devices can ensure that no other computing device in the group has cheated by hashing its current result (which should be the same across all computing devices in the group) with a piece of public information (such as a process ID assigned to the computing device), and sharing this with the group of computing devices. One or more computing devices in the group can check the current results received from other computing devices in the group to confirm that the other computing devices are participating and have obtained the same result.

Mathematical Theory of Distributed Average Consensus (DAC)

The distributed average consensus (DAC) algorithm is used in conjunction with a calculation in which a number of agents (e.g., N distributed computing devices 130), referred to as $N_{process}$ agents, must agree on their average value. The continuous time model for the local agent state governed by the DAC algorithm is given by the feedback model:

$$\dot{x}_i(t) = u_i(t)$$

$$x_i \in \mathbb{R}^n$$

$$i \in \{1, \ldots, N_{process}\} \quad (1)$$

where $x_i(t)$ is the numerical state of process i at time t, $\dot{x}_i(t)$ is the time derivative of the state, and $u_i(t)$ represents a particular consensus feedback protocol.

For illustrative purposes, a Nearest Neighbor protocol is used as the consensus feedback protocol:

$$u_i(t) = \Sigma_{v_j \in N_i}(x_j(t) - x_i(t)) \quad (2)$$

where $N_i$ is the neighbor set of process i.

The global system can be written as the following dynamical system of the equations:

$$\dot{x}(t) = -Lx(t)$$

$$x_i \in \mathbb{R}^{nN_{process}}$$

$$L \in \mathbb{R}^{nN_{process} \times nN_{process}} \quad (3)$$

where L is the graph Laplacian matrix.

In the case of a connected network, the unique and universally convergent equilibrium state of this system is as follows:

$$x_i(\infty) = \frac{1}{N_{process}} 1^T x(0) \quad (4)$$

where $1^T \in \mathbb{R}^{nN_{process}}$ is a vector of all ones. This result means that the agents in the network (e.g., the distributed computing devices 130) not only come to an agreement on a value, but a particular unique value: the average of the initial conditions of the agents on the network.

The rate at which $x_i(t)$ converges to $x_i(\infty)$ for this protocol is proportional to the smallest nonzero eigenvalue of the system Laplacian matrix L. Furthermore, the equilibrium state can be attained under dynamic, directional topologies with time delays. This notion of consensus is suitable for a distributed protocol since each process requires communication only with a set of neighboring processors, and there is no need for a fusion center or centralized node with global information. It is in this sense that consensus can be exploited in the distributed computing environment 100 to achieve a variety of useful tools for distributed computing, such as multi-agent estimation and control. Distributed consensus is particularly advantageous for performing reductions on distributed data because it bypasses the need for sophisticated routing protocols and overlay topologies for complicated distributed networks.

In order for each distributed computing device 130 to gauge its proximity to the global average and, based on the proximity, determine when to terminate the DAC algorithm, the distributed computing devices 130 compute a convergence indicator after each set of connections (e.g., after forming the set of connections shown in FIG. 4A or 4B). The convergence indicator can be represented geometrically, e.g., as a circle, sphere, or hypersphere, or, more generally, an n-sphere. An n-sphere is a generalization of a sphere to a space of arbitrary dimensions; for example, a circle is a 1-sphere, and an ordinary sphere is a 2-sphere. The distributed computing devices 130 can be assigned initial portions of the geometric structure, each having a center of mass. During each iteration of the DAC algorithm, each distributed computing device 130 exchanges with at least one neighboring distributed computing device two pieces of data: the distributed computing device's current $x_i(t)$, and the distributed computing device's current mass and position in the convergence indicator. Each distributed computing device 130 averages its $x_i(t)$ with the received $x_j(t)$ received from its neighbor to calculate $x_i(t+1)$; similarly, each distributed computing device 130 combines its center of mass with its neighbor's to determine a new center of mass. When the exchanges lead to the convergence indicator becoming sufficiently close to the global center of mass of the geometric structure, the DAC algorithm terminates, and the last $x_i$ can be used to calculate the final result of the computation task. A given distance from the center of mass of the geometric structure can be defined as a convergence threshold for determining when the process has converged. If the convergence process does not reach the center of mass of the geometric structure, this indicates that at least one distributed computing device 130 did not participate in the calculation.

Figures 5A, 5B:
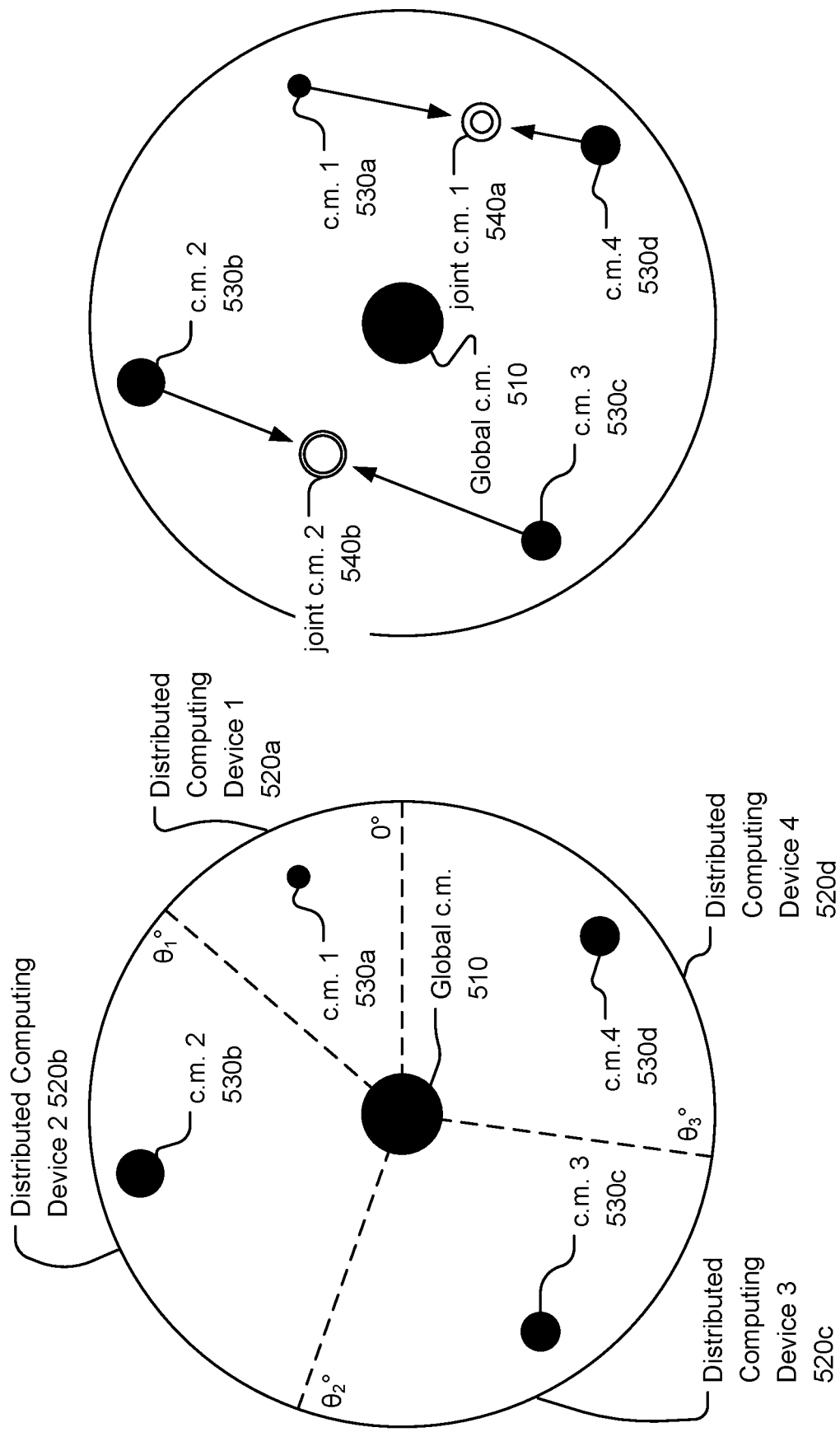
FIG. 5A is a graphical illustration of an initialized distributed average consensus convergence indicator, according to one embodiment.
FIG. 5B is a graphical illustration of a first peer-to-peer update in a distributed average consensus convergence indicator, according to one embodiment.

An exemplary convergence scheme based on a unit circle is shown in FIGS. 5A and 5B. FIG. 5A is a graphical illustration of an initialized distributed average consensus convergence indicator, according to one embodiment. In this example, the convergence indicator is a circle having a global center of mass (c.m.) 510. Each distributed computing device 130 that signed the smart contract 150 is assigned a random, non-overlapping portion of an arc on a circle, e.g., a unit circle. For example, the smart contract scheduler 120, the requesting computing device 110, or one of the distributed computing devices 130 may determine and assign arcs to the participating distributed computing devices 130. In the example shown in FIG. 5A, a first portion of the arc between 0° and $\theta_1$° is assigned to a distributed computing device 1 520a. Three additional portions of the circle are assigned to three additional distributed computing devices 520b-520d. The distributed computing devices 520 are embodiments of the distributed computing devices 130 described above. As shown in FIG. 5A, the arcs are not of equal size; for example, the arc assigned to distributed computing device 1 520a is smaller than the arc assigned to distributed computing device 2 520b. Each distributed computing device 520 computes the center of mass (c.m.) 530 of its unique arc, including both the mass and location of the center of mass. The differing masses are represented in FIG. 5A as different sizes of the centers of mass 530; for example, the circle around c.m. 1 530a is smaller than the circle around c.m. 2 530b, because the portion assigned to distributed computing device 1 520a is smaller than the portion assigned to distributed computing device 2 520b and therefore has a smaller mass.

After each successful connection (e.g., after the distributed computing devices 520 form the first set of peer connections shown in FIG. 4A or the second set of peer connections shown in FIG. 4B), each distributed computing device updates the location of its c.m. relative to the c.m. of the distributed computing device to which it connected and exchanged data. FIG. 5B is a graphical illustration of a first peer-to-peer update in the distributed average consensus convergence indicator shown in FIG. 5A. In this example, distributed computing device 1 520a has connected to distributed computing device 4 520d, and distributed computing device 2 520b has connected to distributed computing device 3 520c. Each set of connecting distributed computing devices exchange their respective centers of mass and calculate a joint center of mass. For example, distributed computing devices 1 and 4 calculate the joint c.m. 1 540a based on the locations and masses of c.m. 1 530a and c.m. 4 530d. As shown, joint c.m. 1 540a is partway between c.m. 1 530a and c.m. 4 530d, but closer to c.m. 4 530d due to its larger mass.

As described with respect to FIGS. 4A and 4B, the distributed computing devices 520 continue forming different sets of connections. This iterative procedure of connecting, exchanging, and updating continues until the distributed computing devices 520 reach a center of mass that is within a specified distance of the global center of mass 510, at which point the distributed computing devices 520 terminate the consensus operation. The specified distance from the global center of mass 510 for stopping the iterative procedure may be a specified error tolerance value, e.g., 0.0001, or $1 \times 10^{-10}$. If the distributed computing devices 520 do not reach the global center of mass 510, this indicates that at least one distributed computing device did not participate in the consensus mechanism. For example, if one distributed computing device did not participate in consensus, the center of mass determined by the DAC procedure is pulled away from that distributed computing device's portion of the arc, because that distributed computing device, represented by its assigned mass, did not contribute to DAC procedure. The distributed computing devices 520 may perform the iterative procedure a particular number of times before stopping even if convergence is not reached. The number of iterations to attempt convergence may be based on the number of distributed computing devices participating in the DAC process. Alternatively, the distributed computing devices may perform the iterative procedure until the center of mass becomes stationary, e.g., stationary within a specified threshold.

If multiple distributed computing devices do not participate in consensus, it may be difficult to identify the non-participating computing devices from a circular structure. Therefore, in some embodiments, a higher dimensional shape is used as the convergence indicator, such as a sphere or a hypersphere. In such embodiments, each distributed computing device is assigned a higher-dimensional portion of the shape; for example, if the convergence indicator is a sphere, each distributed computing device is assigned a respective section of the sphere. Using a higher number of dimensions for a higher number of distributed computing devices involved in a computation task (e.g., N dimensions for N distributed computing devices) can ensure that the non-participating distributed computing devices are identified.

Example Applications of Distributed Average Consensus (DAC)

The DAC algorithm can be used to perform a dot product calculation. The dot product is one of the most important primitive algebraic manipulations for parallel computing applications. Without a method for computing distributed dot products, critical parallel numerical methods (such as conjugate gradients, Newton-Krylov, or GMRES) for simulations and machine learning are not possible. The DAC algorithm, described above, can be used to perform a dot product of two vectors x and y, represented as $x^T y$, in a distributed manner by assigning distributed computing devices 130 to perform respective local dot products on local sub-vectors, and then having the distributed computing devices 130 perform consensus on the resulting local scalar values. After consensus is reached, the result of the consensus on the scalar values is multiplied by the number of processes in the computation. The relationship between the dot product $x^T y$ of two vectors of length n and the average of the local scalar calculations $x_i y_i$ is as follows:

$$x^T y = x_1 y_1 + \ldots + x_n y_n = n \left( \sum_{i=1}^{n} \frac{x_i y_i}{n} \right) \quad (5)$$

Figure 6:
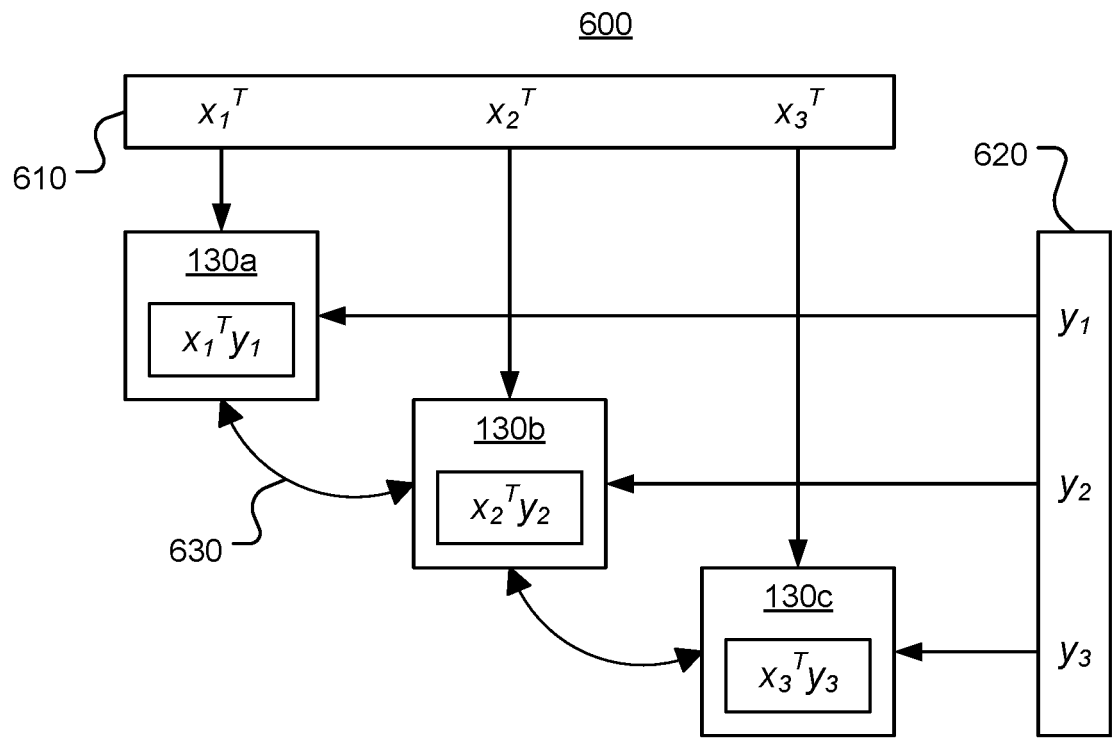
FIG. 6 illustrates an example of using distributed computing devices to perform a distributed dot product calculation, according to one embodiment.

FIG. 6 illustrates an example 600 of using three distributed computing devices to perform a distributed dot product calculation, according to one embodiment. In FIG. 6, a first vector x 610 is partitioned into three sub-vectors, $x_1^T$, $x_2^T$, and $x_3^T$. A second vector y 620 is also partitioned into three sub-vectors, $y_1$, $y_2$, and $y_3$. A first distributed computing device 130a receives the first vector portions $x_i^T$ and $y_1$ and calculates the dot product $x_1^T y_1$. Second and third distributed computing devices 130b and 130c calculate dot products $x_2^T y_2$ and $x_3^T y_3$, respectively. The distributed computing devices 130a-130c exchange the dot products via connections 630 and calculate averages, as described above, until consensus is reached. After consensus, the average dot product is multiplied by the number of participating distributed computing devices 130 (in this example, 3) to determine $x^T y$.

The DAC algorithm can be performed on scalar quantities, as shown in the dot product example, and on vector quantities. In a second example, the DAC algorithm is used to perform a distributed matrix-vector product calculation. Distributed matrix-vector products are essential for most iterative numerical schemes, such as fixed point iteration or successive approximation. To calculate a matrix-vector product, a matrix is partitioned column-wise, and each distributed computing device 130 receives one or more columns of the global matrix. A local matrix-vector product is calculated at each distributed computing device 130, and average consensus is performed on the resulting local vectors. The consensus result is then multiplied by the number of distributed computing devices 130 in the computation.

Figure 7:
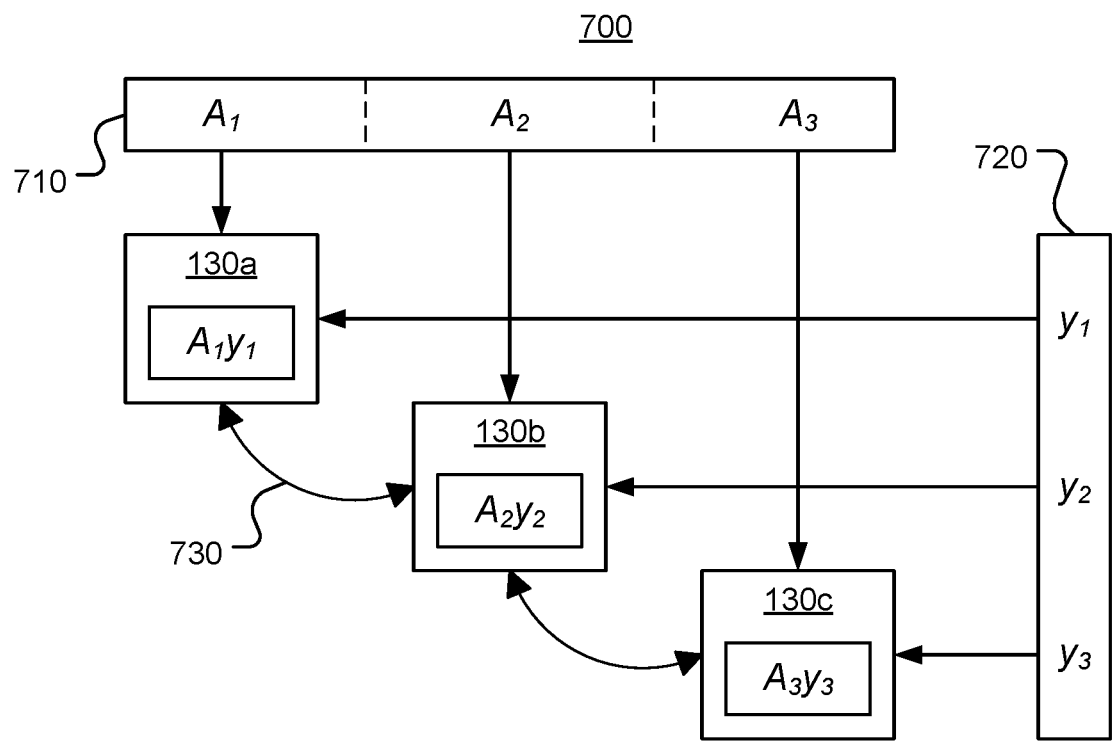
FIG. 7 illustrates an example of using distributed computing devices to perform a distributed matrix-vector product calculation, according to one embodiment.

FIG. 7 illustrates an example 700 of using three distributed computing devices to perform a distributed matrix-vector product calculation, according to one embodiment. In FIG. 7, a first matrix A 710 is partitioned column-wise into three sub-matrices, $A_1$, $A_2$, and $A_3$. A vector y 720 is partitioned into three sub-vectors, $y_1$, $y_2$, and $y_3$. The first distributed computing device 130a receives the first matrix portion $A_1$ and the first vector portion $y_1$ and calculates the matrix-vector product $A_1 y_1$. The second and third distributed computing devices 130b and 130c calculate the matrix-vector products $A_2 y_2$ and $A_3 y_3$, respectively. The distributed computing devices 130a-130c exchange the matrix-vector products via connections 730 and calculate averages, as described above, until consensus is reached. After consensus, the average matrix-vector product is multiplied by the number of participating distributed computing devices 130.

As another example, the DAC algorithm is used to calculate a distributed least squares regression. Least squares is one of the most important regressions used by scientists and engineers. It is one of the main numerical ingredients in software designed for maximum likelihood estimation, image reconstruction, neural network training, and other applications. The problem of finding the least-squares solution to an overdetermined system of equations can be defined as follows:

$$Ax = b$$

$$A \in \mathbb{R}^{(n \cdot N_{process}) \times M} \tag{6}$$

In the above equations, A is a sensing matrix, x is the least-squares solution vector, and b is a target vector. The solution to this problem is given by the pseudo inverse, as follows:

$$x = (A^T A)^{-1} A^T b \tag{7}$$

In some embodiments of parallel computing applications, the sensing matrix, A, is distributed row-wise and the least-squares solution, x, is solved for locally on each computational node since the local least-squares solutions, or components of the least-squares solutions (e.g., local components for $A^T b$ and $A^T A$) are small in comparison to the total number of measurements. This means that each distributed computing device 130 in the network owns a few rows (e.g., measurements) of the sensing matrix A and the target vector b. The least squares solution x for the system can be recovered from the local least-squares solutions using the DAC algorithm. The portions of the sensing matrix and target vector owned by a given distributed computing device i are represented as $A_i$ and $b_i$, respectively. Each distributed computing device i calculates the products $A_i^T b_i$ and $A_i^T A_i$ and stores these products in its local memory. DAC is then performed on these quantities, which both are small compared to the total number of observations in A. The results of the DAC process are $$\frac{1}{n} \sum_{i=1}^{n} A_i^T A_i \text{ and } \frac{1}{n} \sum_{i=1}^{n} A_i^T b_i,$$

which are present at every distributed computing device at the end of the DAC process. These quantities are multiplied by the number n of processes in the computation, so that every distributed computing device has copies of $A^T b$ and $A^T A$ that can be used to locally obtain the least squares fit to the global data set.

Figure 8:
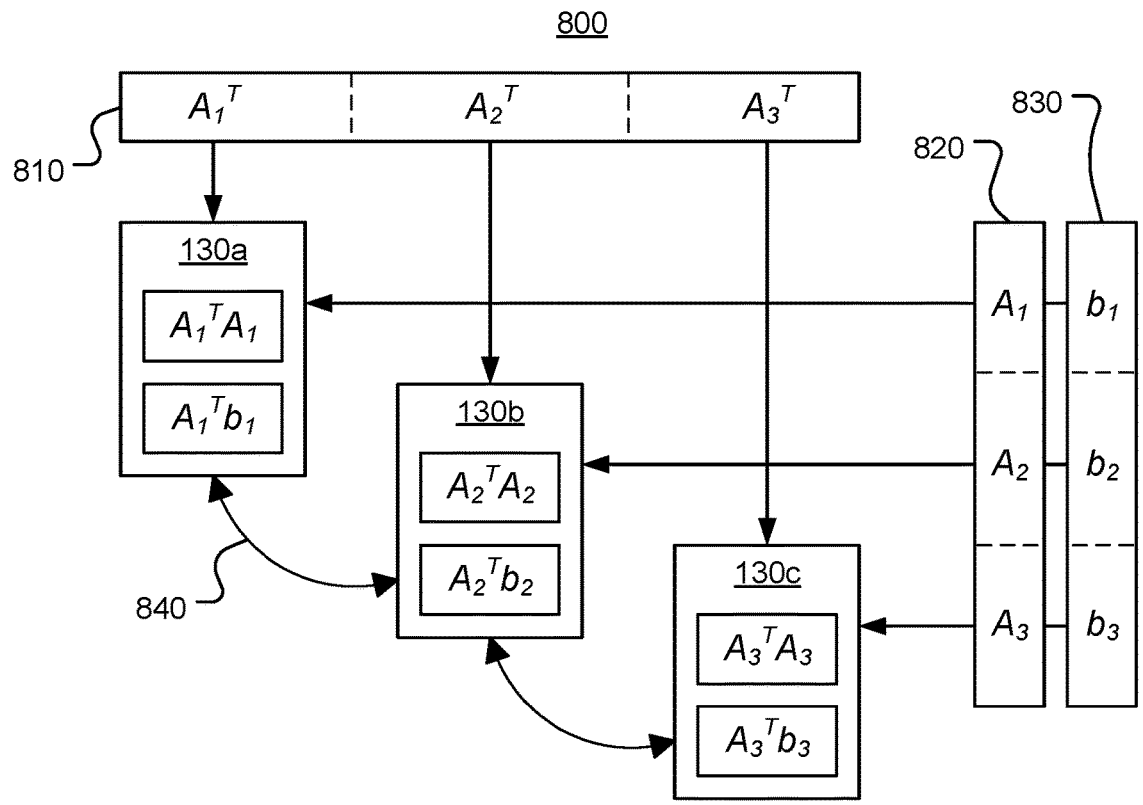
FIG. 8 illustrates an example of using distributed computing devices to perform a distributed least squares calculation, according to one embodiment.

FIG. 8 illustrates an example 800 of using three distributed computing devices to perform a distributed least squares calculation, according to one embodiment. In FIG. 8, the transpose of the sensing matrix $A^T$ 810 is partitioned column-wise into three sub-matrices, $A_1^T, A_2^T,$ and $A_3^T$. The sensing matrix A 820 is partitioned row-wise into three sub-matrices, $A_1, A_2,$ and $A_3$. Each distributed computing device 130a-130c calculates a respective matrix-matrix product $A_1^T A_1, A_2^T A_2,$ and $A_3^T A_3$. In addition, each distributed computing device 130a-130c has a respective portion of the target vector b 830 and calculates a respective matrix-vector product $A_1^T b_1, A_2^T b_2,$ and $A_3^T b_3$, similar to the calculation shown in FIG. 7. The distributed computing devices 130a-130c exchange the matrix-matrix products and matrix-vector products via connections 840 and calculate averages of these products, as described above, until consensus is reached. After consensus, the average matrix-matrix product and average matrix-vector product are multiplied by the number of participating distributed computing devices 130, and the results are used to calculate the least square solution x.

As another example, the DAC algorithm can be applied to decentralized Bayesian parameter learning. Many industrial applications benefit from having a data-driven statistical model of a given process based on prior knowledge. Economic time series, seismology data, and speech recognition are just a few big data applications that leverage recursive Bayesian estimation for refining statistical representations. DAC can be used to facilitate recursive Bayesian estimation on distributed data sets.

In an exemplary decentralized Bayesian parameter learning process, each distributed computing device attempts to estimate a quantity, x, via a probability distribution, $p(x) = p(x|y_{1:n})$. Each distributed computing device $i \in \{1, \ldots n\}$ makes an observation, $y_i$, that is related to the quantity of interest through a predefined statistical model $\mu_i(y_i, x)$. Under mild conditions, the Bayesian estimate of x is proportional to:

$$\pi(x) \propto \pi_0(x) \Pi_{i=1:n} \mu_i(y_i, x) \tag{8}$$

where $\pi_0(x)$ is the prior distribution based on past knowledge. The posterior estimate, $\pi(x)$, conditional on the distributed measurements can be computed using the DAC approach by rewriting the product term in equation 8 in the form of an average quantity:

$$\pi(x) \propto \pi_0(x) \exp\left(\frac{1}{n} \sum_{i=1:n} \ln(\mu_i(y_i, x))\right)^n \tag{9}$$

Leveraging DAC to compute the global average of the distributed measurement functions allows each distributed computing device to consistently update its local posterior estimate without direct knowledge or explicit communication with the rest of the global data set.

Figure 9:
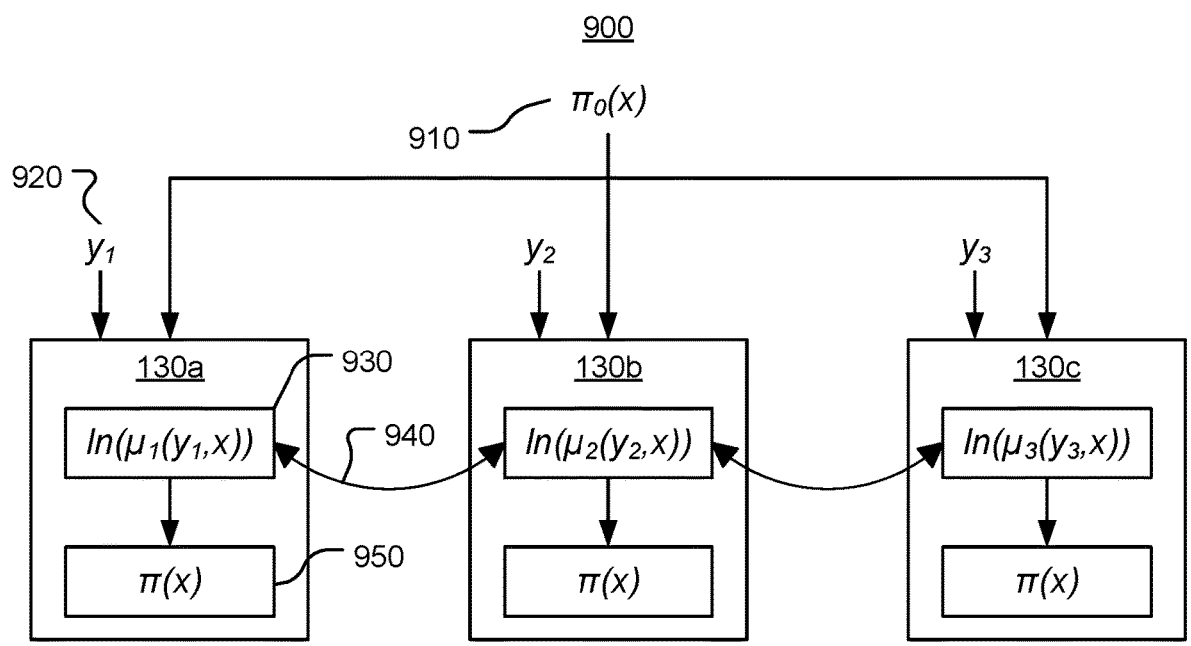
FIG. 9 illustrates an example of using distributed computing devices to perform decentralized Bayesian parameter learning, according to one embodiment.

FIG. 9 illustrates an example 900 of using three distributed computing devices to perform decentralized Bayesian parameter learning, according to one embodiment. In FIG. 9, each distributed computing device 130 receives or calculates the prior distribution $\pi_0(x)$ 910. In addition, each distributed computing device 130a makes or receives a respective observation or set of observations $y_i$; for example, distributed computing device 130a receives the observation $y_1$ 920. Based on the prior distribution $\pi_0(x)$ and observation $y_i$, each distributed computing device 130a-130c calculates the quantity $\ln(\mu_i(y_i, x))$; for example distributed computing device 130 calculates $\mu_1(y_1, x)$ 930. The distributed computing devices 130a-130c exchange the calculated quantities via connections 940 and calculate averages, as described above, until consensus is reached. After consensus, the distributed computing devices 130 use the average of the quantity $\ln(\mu_i(y_i, x))$ to calculate the posterior estimate, $\pi(x)$ 950, according to equation 9.

While four example calculations described shown in FIGS. 6-9 each are shown in distributed environments with three computing devices, it should be understood that the calculations can be performed using larger sets of distributed computing devices. In addition, the DAC method can be used for other types of calculations that involve calculating an average, e.g., any type of calculation from which a higher result can be obtained from an average.

Figure 10:
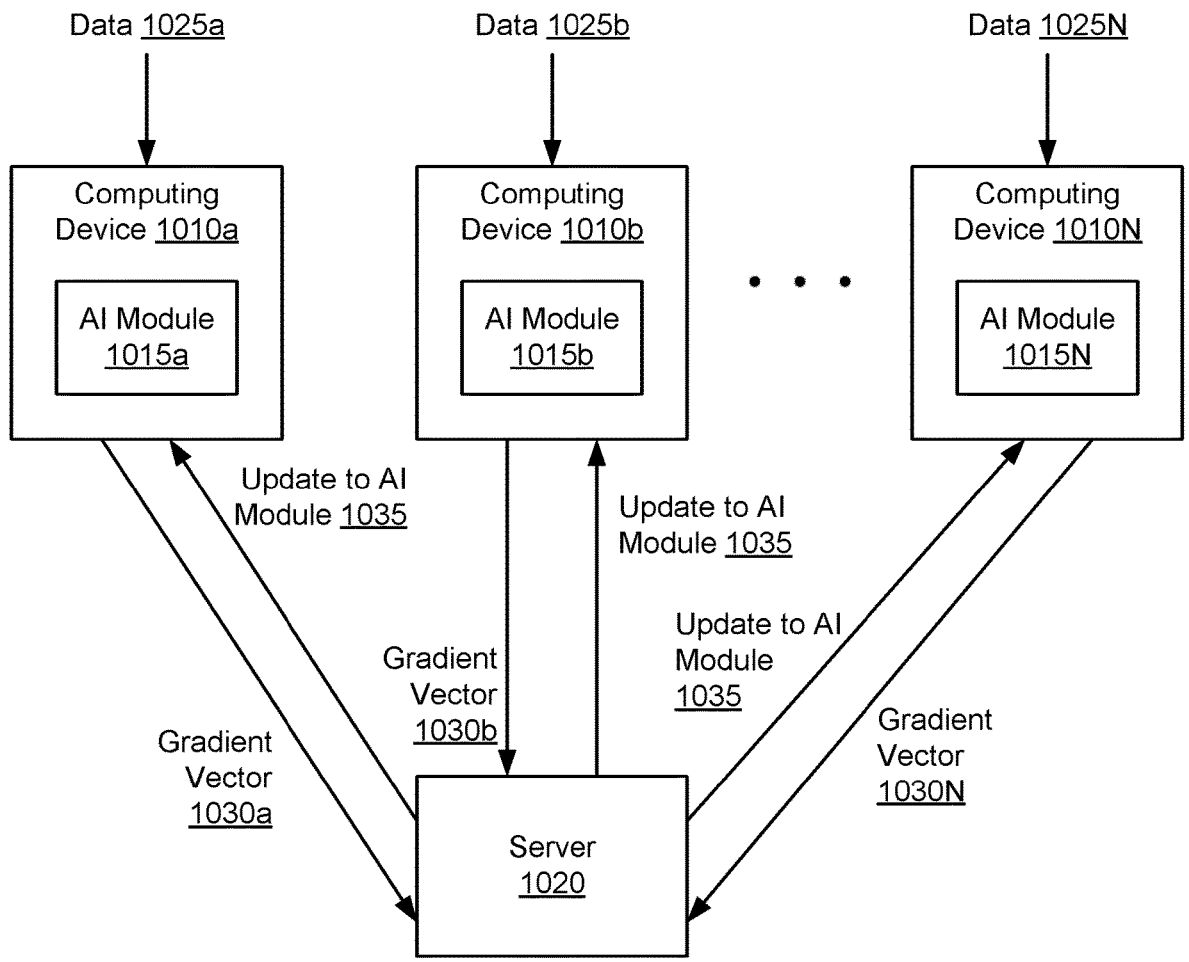
FIG. 10 is a flow diagram illustrating a prior art procedure for training an artificial intelligence (AI) model.

Using Distributed Average Consensus (DAC) to Train an Artificial Intelligence Model In prior systems for improving artificial intelligence (AI) models using data collected in a distributed manner, a "gather and scatter" method was used to generate and propagate updates to the AI models based on collected data. FIG. 10 shows an exemplary prior art system 1000 performing the gather and scatter method for training an AI model. As shown in FIG. 10, a number N of computing devices 1010, referred to as computing device 1010a through computing device 1010N, are connected to a server 1020. Each computing device 1010 includes an AI module 1015. Each AI module 1015 can include, among other things, an AI model (such as a neural network) for making one or more predictions based on input data, e.g., data 1025 collected or received by the computing device 1010. In this example, each AI module 1015 is also configured to generate a gradient descent vector 1030 based on the received data; the gradient descent vectors 1030a-1030N are used to train the AI model. Each gradient descent vector 1030 calculated by each AI module 1015 is transmitted by each computing device 1010 to the server 1020; for example, computing device 1010a transmits gradient descent vector 1030a to the server 1020. Based on all of the received gradient descent vectors 1030a-1030N, the server 1020 optimizes and updates the AI model, and based on the updated AI model, the server 1020 transmits an update to the AI module 1035 to each of the computing devices 1010a-1010N.

The gather and scatter method requires a central server 1020 to manage the process of updating the AI model. The server 1020 must be reliable, and each computing device 1010 must have a reliable connection to the server 1020 to receive updates to the AI model. The processing performed by the server 1020 on the gradient vectors 1030a-1030N to generate the update 1030 can require a large amount of computing and storage resources, especially if the number of computing devices N is large and/or the gradient vectors 1030 are large. Further, the gather and scatter method does not take advantage of the computing resources available on the computing devices 1010a-1010N themselves.

Figure 11:
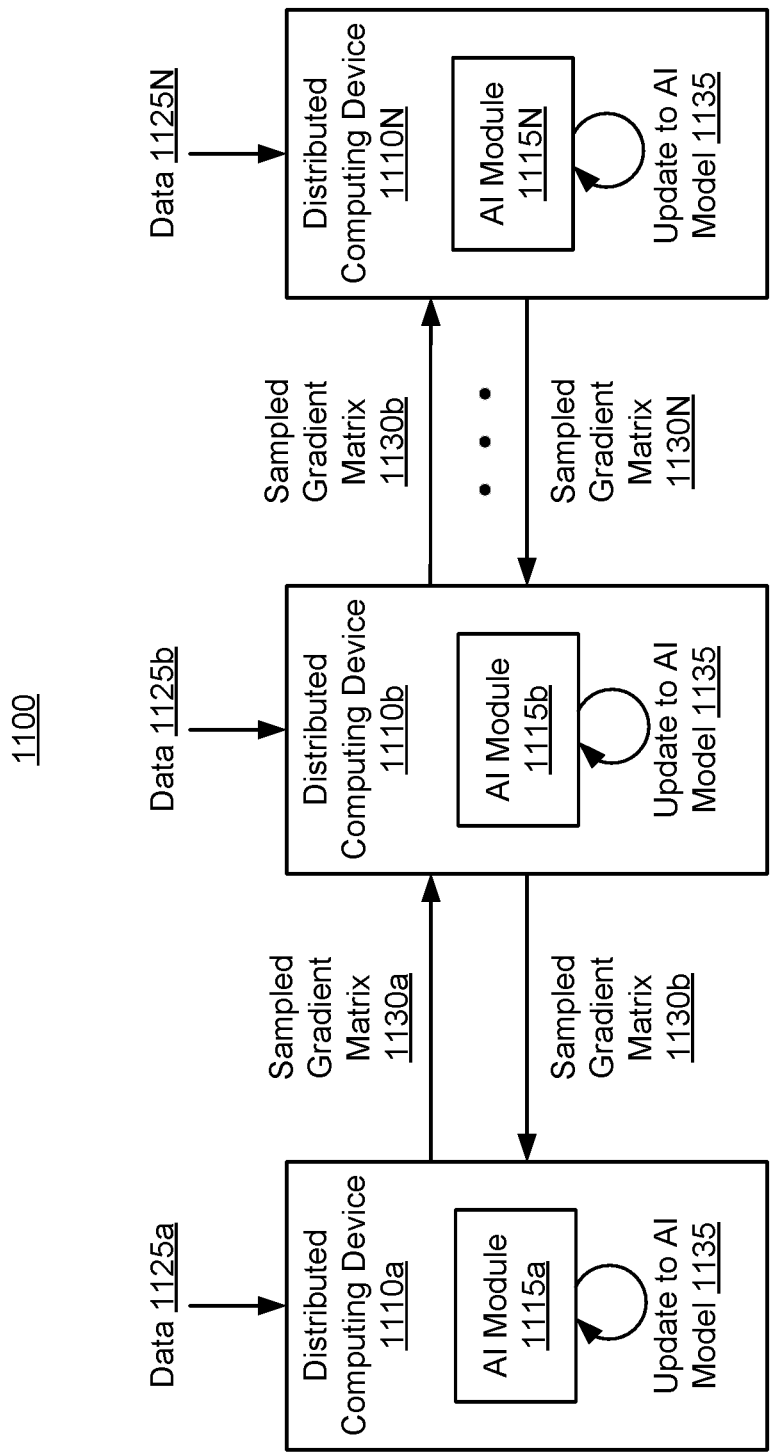
FIG. 11 is a flow diagram illustrating a procedure for training an artificial intelligence (AI) model using distributed average consensus, according to one embodiment.

FIG. 11 illustrates a system 1100 for training an artificial intelligence (AI) model using distributed average consensus, according to one embodiment. FIG. 11 includes a number N of distributed computing devices 1110, referred to as distributed computing device 1110a through distributed computing device 1110N. The distributed computing devices 1100 may be embodiments of the distributed computing devices 130 described above. Each distributed computing device 1110 receives respective data 1125. For example, distributed computing device 1110a receives data 1125a, distributed computing device 1110b receives data 1125b, and so on. The respective data 1125 received by two different distributed computing devices may be different; for example, data 1125a may be different from data 1125b. The data 1125 may be structured as sets of training pairs including one or more data inputs paired with one or more labels. The data 1125 may be generated internally by the distributed computing device 1110, received from one or more sensors within or connected to the distributed computing device 1110, received from one or more users, received from one or more other distributed computing devices, or received from some other source or combination of sources.

Each distributed computing device 1110 includes an AI module 1115. The AI module 1115 includes an AI model for processing one or more input signals and making predictions based on the processed input signals. For example, the AI model may be a neural network or other type of machine learning model. In addition, each AI module 1115 is configured to train the AI model based on the data 1125 received by the set of distributed computing devices 1110. The AI modules 1115 of different distributed computing devices 1110 may be functionally similar or identical. In general, the AI module 1115 generates data for optimizing the AI model based on its respective received data 1125, compresses the generated data, and exchanges the compressed data with the compressed data generated by other AI modules 1115 of other distributed computing devices 1110. The AI modules 1115 execute a convergence algorithm, such as the distributed average consensus (DAC) algorithm described above, on the exchanged compressed data to obtain a consensus result for optimizing the AI model. Each respective AI module 1115 updates its local AI model based on the consensus result.

In some embodiments, to generate the data used to optimize the AI model, each AI module 1115 is configured to compute a gradient descent vector for each training pair (e.g., one or more data inputs paired with one or more labels) in the respective data 1125 received by the distributed computing device 1110 based on a locally-stored AI model. For example, the AI module 1115a of distributed computing device 1110a calculate a gradient descent vector for each training pair included in the data 1125a. The AI module 1115 is further configured to concatenate the gradient descent vectors to form a gradient descent matrix, and sample the gradient descent matrix to generate a sampled gradient matrix 1130, which is shared with the other distributed computing devices in a peer-to-peer fashion. For example, distributed computing device 1110b shares its sampled gradient matrix 1130b with both distributed computing device 1110a and distributed computing device 1110N, and receives the sampled gradient matrices 1130a and 1130N from distributed computing devices 1110a and 1110N, respectively. The distributed computing devices 1110 form various sets of connections, as described with respect to FIG. 4, and exchange sampled gradient matrices 1130 until the distributed computing devices 1110 reach consensus according to the DAC algorithm, as described above. In particular, after performing the DAC process, each distributed computing device 1110 has a local copy of a consensus gradient matrix.

The length and number of gradient descent vectors produced by an AI module 1115 can be large. While a single gradient descent vector or matrix (e.g., a gradient vector 1030 described with respect to FIG. 10, or a set of gradient descent vectors generated by one distributed computing device 1110) can be generated and stored on a single distributed computing device 1110, if the number of distributed computing devices N is large, a single distributed computing device 1110 may not be able to store all of the gradient descent vectors generated by the N distributed computing devices, or even the gradient descent vectors generated by a portion of the N distributed computing devices. In addition, transferring a large number of large vectors between the distributed computing devices 1110a-1110N uses a lot of communication bandwidth. To reduce the size of data transfers and the computational resources required for each distributed computing device 1110, the AI module 1115 samples each matrix of gradient descent vectors.

In addition, the distributed computing devices 1110a-1110N run a convergence algorithm on the exchanged data (e.g., the exchanged sampled gradient matrices) to determine whether a distributed average consensus (DAC) on the exchanged data has obtained by all of the distributed computing devices 1110a-1110N. For example, the distributed computing devices 1110a-1110N may perform distributed average consensus on sampled gradient descent matrices to obtain a global matrix of the same size as the sampled gradient descent matrices. When each distributed computing device 1110 has received some or all of the other sampled gradient matrices 1130, and a distributed average consensus has been achieved, each AI module 1115 generates its own update to the AI model 1135. The update 1135 may be an optimization of the weights of the AI model stored in the AI module 1115 based on the sampled gradient matrices 1130a-1130N, including the locally generated sampled gradient matrix and the matrices received from peer distributed computing devices.

As described above, the DAC process ensures that each distributed computing device 1110 has contributed to the coordinated learning effort undertaken by the distributed computing devices 1110a-1110N. The coordinated learning process runs without the need for a central server. In addition, because the distributed computing devices 1110a-1110N exchange sampled gradient matrices 1130a-1130N, rather than the underlying data 1125a-1125N, the privacy of the distributed computing devices 1110 and their users is maintained. For example, when distributed computing device 1110a receives the sampled gradient matrix 1130b from another distributed computing device 1110b, the distributed computing device 1110a cannot determine any personal information about the data 1125b collected by the distributed computing device 1110b from the received sampled gradient matrix 1130b.

In an example, the training of a neural network consists of specifying an optimization objective function, $\mathcal{F}: \mathbb{R}^{M_{in}} \to \mathbb{R}^+$, that is a function of both the network weights, $w \in \mathbb{R}^{N_w}$, (i.e. the network topology) and the available training data, $\{x_i \in \mathbb{R}^{M_{in}}, y_i \in \mathbb{R}^{M_{out}}\}_{i=1}^{N_x}$, where x represents the primal data, y represents the associated labels, and $N_x$ is the number of training examples. The goal of neural network training is to produce a predictive neural network by manipulating the weights w such that the expected value of the objective function $\mathcal{F}$ is minimized. This goal can be expressed as follows:

$$\underset{w \in \mathbb{R}^{N_w}}{minimize} \; \mathbb{E}[\mathcal{F}(x,y;w)] \quad (10)$$

The method of gradient descent can be used to tune the weights of a neural network. Gradient descent involves the evaluation of the partial derivative of the objective function with respect to the vector of weights. This quantity is known as the gradient vector, and can be expressed as follows:

$$\frac{\partial \mathcal{F}(x, y; w)}{\partial w} \in \mathbb{R}^{N_w} \quad (11)$$

A gradient vector can be computed for each training pair $(x_i, y_i)$ in the training set. As described above, the AI module 1115 computes a gradient vector for each training pair in the data 1125 received at each distributed computing device 1110.

To approximate the data set used for optimization, a cooperative subspace approach that combines the DAC process with the theory of random sampling can be used. A cooperative subspace is used to sample the gradient vectors (e.g., to form sampled gradient vectors 1130) so that the DAC process can be performed more efficiently. As an example, $A_i \in \mathbb{R}^{N \times k_i}$ represents the matrix of data that is local to a given distributed computing device 1110, referred to as node i, $i = \{1, \ldots, N_{nodes}\}$, and $A = [A_1, \ldots, A_{N_{nodes}}] \in \mathbb{R}^{N \times (k_i N_{nodes})}$ represents the global data set (i.e., the data 1125 received by the set of distributed computing devices 1110). The cooperative subspace approach computes, in a fully distributed fashion, a representative subspace, $U \in \mathbb{R}^{N \times q}$ that approximates the range of A such that $\|A - UU^T A\| \leq \epsilon \|A\|$, where $\epsilon$ is a user specified tolerance on the accuracy of the approximation between 0 and 1.

Figure 12:
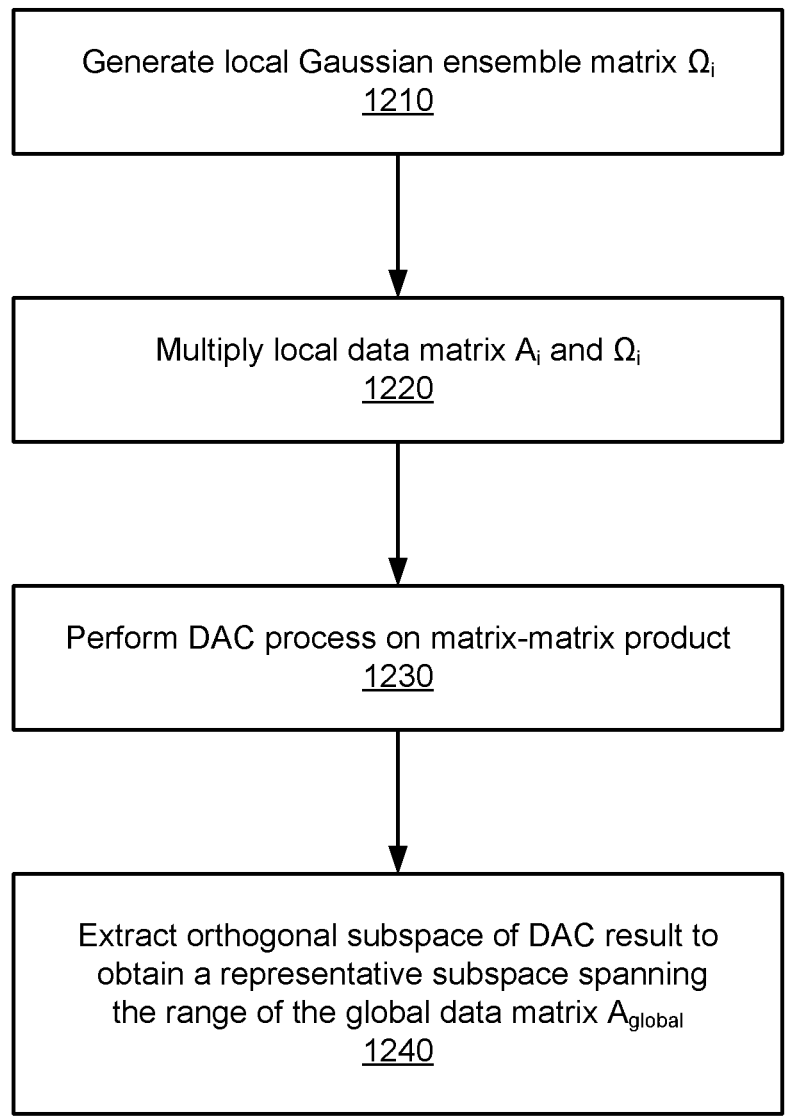
FIG. 12 is a flowchart showing a method for determining a consensus result within a cooperative subspace, according to one embodiment.

FIG. 12 is a flowchart showing a method 1200 for determining a consensus result within a cooperative subspace at a particular distributed computing device i, e.g., one of the distributed computing devices 1110. The distributed computing device 1110 generates 1210 a Gaussian ensemble matrix $\Omega_i \in \mathbb{R}^{k_i \times q}$ The Gaussian ensemble matrix is a matrix of random values used to sample a local data matrix A. For example, the local data matrix $A_i$ is the matrix of gradient descent vectors computed by the AI module 1115 of a given distributed computing device 1110 based on the data 1125 received by the distributed computing device 1110. Each distributed computing device 1110 generates its random matrix $\Omega_i$ independently. In other embodiments, other types of random matrices are used.

The distributed computing device 1110 multiplies 1220 its local data matrix $A_i$ of data local to the distributed computing device 1110 and its Gaussian ensemble matrix a to generate the matrix-matrix product $Y_i = A_i \Omega_i \mathbb{R}^{N \times q}$. The product $Y_i$ is an approximation of the data in the local data matrix $A_i$ and compresses the local data. While the full data matrix $A_{global}$ that includes the data from each distributed computing device 1110 may be too large to be stored on and manipulated by a single distributed computing device 1110, the sampled data matrix $Y_i$ is sufficiently small to be stored on and manipulated by a single distributed computing device 1110.

The distributed computing device 1110, in cooperation with the other distributed computing devices in the system, performs 1230 the DAC process on the sampled data matrices $Y_i$. The DAC process is performed according to the procedure described above. A convergence indicator, such as the convergence indicators described with respect to FIGS. 5A and 5B, may be used to determine when to terminate the DAC process. The DAC process produces a normalized global matrix-matrix product $Y_{global}$ on each node, which can be represented as follows:

$$Y_{Global} = \frac{1}{N_{nodes}} A [\Omega_1^T, \ldots, \Omega_{N_{nodes}}^T]^T \in \mathbb{R}^{N \times q} \quad (12)$$

During a first iteration of DAC process, a distributed computing device 1110 exchanges its sampled data matrix $Y_i$ with another distributed computing device 1110. For example, distributed computing device 1110a transmits the sampled gradient matrix 1130a to the distributed computing device 1110b, and receives sampled gradient matrix 1130b from distributed computing device 1110b. The distributed computing device 1110 calculates an average of its sampled data matrix $Y_i$ and the sampled data matrix received from the other distributed computing device. For example, the distributed computing device 1110 calculates an average of its sampled gradient matrix 1130a and the received sampled gradient matrix 1130b. This results in a consensus gradient descent matrix, which is a matrix of the same size as the sampled data matrix $Y_i$. In subsequent iterations, distributed computing devices 1110 exchange and average their current consensus gradient descent matrices. The consensus gradient descent matrices are repeatedly exchanged and averaged until a consensus result for the consensus gradient descent matrix is reached across the distributed computing devices 1110. The consensus result, which is the matrix $Y_{global}$, is obtained when the consensus gradient descent matrices are substantially the same across all the distributed computing devices 1110, e.g., within a specified margin of error. The convergence indicator described with respect to FIGS. 5A and 5B may be used to determine when $Y_{global}$ has been obtained, and to determine whether all distributed computing devices 1110 participated in determining the consensus result.

After calculating $Y_{global}$, the distributed computing device 1110 extracts 1240 the orthogonal subspace that spans the range of $Y_{global}$ via a local unitary decomposition, i.e., $Y_{Global}=UR$. Following the decomposition, the distributed computing device 1110 (and each other distributed computing device in the system) holds a copy of the representative subspace, $U \in \mathbb{R}^{N \times q}$, that approximately spans the range of the global data matrix $A_{global}$.

In the context of training an AI model, each distributed computing device in the network computes the local gradients associated with its local data set, producing the gradient vectors $$\frac{\partial \mathcal{F}(x, y; w)}{\partial w} i.$$

This gradient vector data is used to form the local data matrix $A_i$ in the cooperative subspace algorithm 1200. The gradient vectors are compressed into a suitably low dimensional subspace according to steps 1210 and 1220, the sampled, global gradient descent vectors are obtained according to the DAC process (step 1230), and gradient descent is performed in the global subspace locally on each agent (step 1240). The AI module 1115 updates its AI model (e.g., by updating the model weights) based on the representative subspace U, which reflects the data 1125 gathered by all of the distributed computing devices 1110.

While algorithms described herein are applied to optimizing a neural network, it should be understood that the algorithms can be applied to any type of machine learning. For example, other optimization techniques for improving machine learned models may be used, such as simulated annealing, nonlinear conjugate gradient, limited-memory BFGS, etc. In addition, other types of machine learning models can be used, such as capsule networks, Bayesian networks, genetic algorithms, etc.

Using Distributed Average Consensus (DAC) to Generate Personalized Recommendations In prior systems for providing personalized recommendations, a centralized system obtains personal user data, such as preferences, purchases, ratings, tracked activities (e.g., clickstreams), or other explicit or implicit preference information. The centralized system trains a recommendation model based on the collected user data, and provides recommendations to a given user based on data collected about that user. The centralized system controls both the model and its users' data. Centralized systems that provide recommendations may also exploit users' data for other purposes, such as targeting content, or selling the data to third parties, that users may not approve of or may not have knowingly consented to. Many users would prefer to receive personalized recommendations without a central system collecting, storing, or distributing data about them.

To generate a recommendation model and personalized recommendations based on the model without exposing personal data, cooperating distributed computing devices according to embodiments herein use a cooperative subspace approach that combines the DAC algorithm described above with the theory of random sampling. Each distributed computing device randomly samples local user preference data in a cooperative subspace. The cooperative subspace approximates the user preference data, reflecting the users of all cooperating distributed computing devices. The sampled preference data is shared among the cooperating distributed computing devices. In particular, the distributed computing devices use the DAC algorithm to cooperatively create a recommendation model based on the sampled preference data of many users. Each distributed computing device individually applies the recommendation model to the distributed computing device's local preference data to generate personalized recommendations for the user of the distributed computing device. The cooperative subspace approach allows the DAC algorithm to be performed efficiently, and the random sampling obscures the underlying user preference data so that users' data privacy is maintained.

The recommendation model can be generated for and applied to any finite set of items. For example, the cooperative subspace approach can be used to generate recommendations for a list of movies available through a particular service, all movies listed on the INTERNET MOVIE DATABASE (IMDB), all songs in a particular song catalog, a list of products for sale on a website, a set of restaurants in a given metro area, etc. The set of items are represented as a vector, with each vector element corresponding to one item in the set. For example, in a vector representing a set of movies, the first vector element corresponds to "The A-Team," the second vector element corresponds to "A.I. Artificial Intelligence," etc. In other embodiments, the set of items may be represented as a matrix, e.g., with each row corresponding to an item in the set, and each column representing a preference feature of the item. For example, for a matrix representing restaurant ratings, one columns in the matrix represents ratings for overall quality, another column represents ratings for food, another column represents ratings for service, and another column represents ratings for décor.

Figure 13:
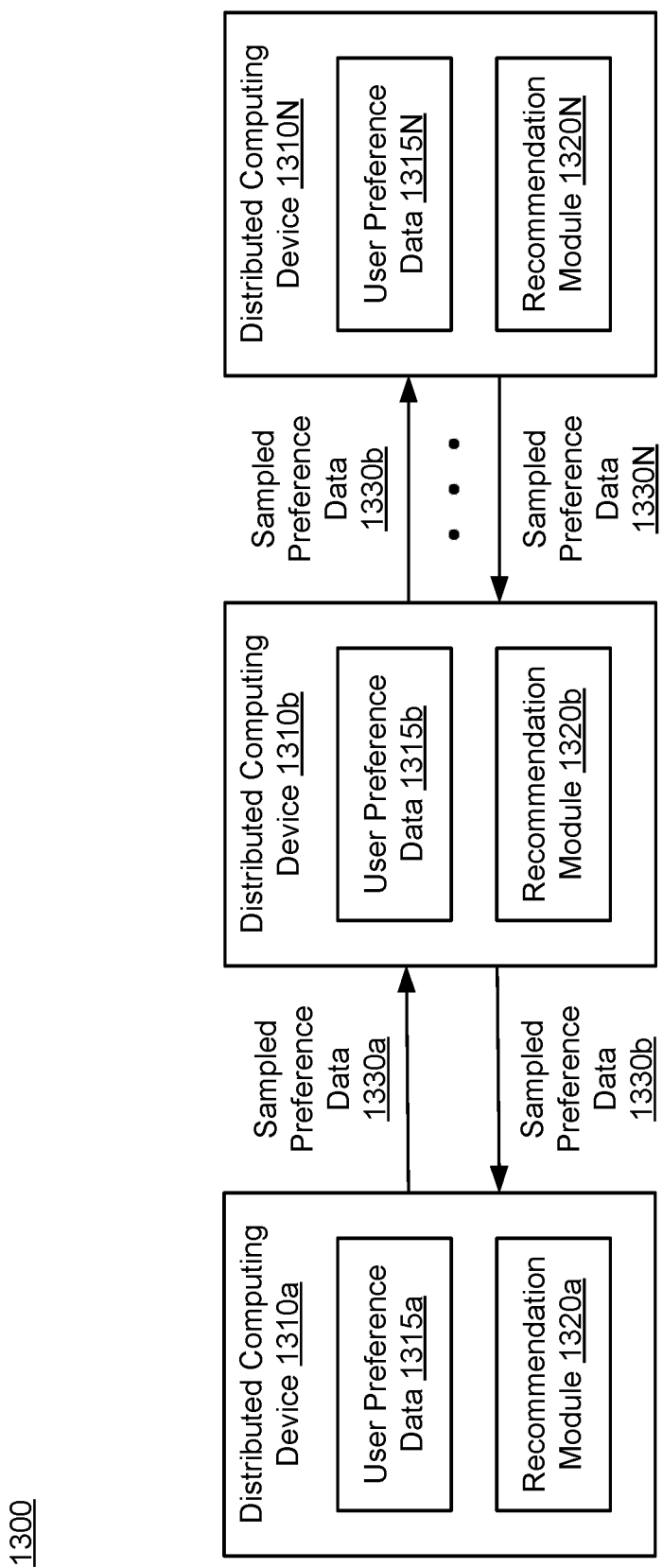
FIG. 13 is a flow diagram illustrating a distributed environment for generating a personalized recommendation model using distributed average consensus, according to one embodiment.

FIG. 13 illustrates a distributed environment 1300 for generating a personalized recommendation model using distributed average consensus, according to one embodiment. FIG. 13 includes a number N of distributed computing devices 1310, referred to as distributed computing device 1310a through distributed computing device 1310N. The distributed computing devices 1310 may be embodiments of the distributed computing devices 130 described above. Each distributed computing device 1310 is associated with a user. Each distributed computing device 1310 includes user preference data 1315 and a recommendation module 1320.

The user preference data 1315 is data that reflects user preferences about some or all items in a set of items. For example, the distributed computing device 1310 receives as user input ratings (e.g., ratings from −1 to 1, or ratings from 1 to 10) for a set of movies. The distributed computing device 1310 stores the user ratings as vector elements corresponding to the movies to which the movies apply. For example, the user provides a rating of 0.8 for "The A-Team," the first element of the movie vector is 0.8. Movies that the user has not rated may be assigned a neutral rating, e.g., 0. In some embodiments, the distributed computing device 1310 normalizes user-supplied ratings, e.g., so that each rating is between 0 and 1. In other examples, the distributed computing device 1310 learns the user preference data 1315 implicitly. For example, the distributed computing device 1310 may assign a relatively high rating (e.g., 1) to each movie that the user watches through to its end, and a relatively low rating (e.g., 0) to each movie that the user starts but does not finish.

The recommendation module 1320 uses the user preference data 1315 to train a recommendation model, which the recommendation module 1320 uses to generate recommendations for the user. The recommendation module 1320 is configured to work cooperatively with the recommendation modules 1320 of other distributed computing devices 1310 to develop the recommendation model. To train the recommendation model, the recommendation module 1320 of each distributed computing device 1310 samples the user preference data 1315 stored locally on the respective distributed computing device 1310 to generate sampled preference data 1330. For example, recommendation module 1320a of distributed computing device 1310a samples the user preference data 1315a to generate the sampled preference data 1330a. The sampled preference data 1330 is a mathematical function of the user preference data 1315 that involves random sampling, such as multiplying the user preference data 1315 by a random matrix. The sampled preference data 1330 is shared with the other distributed computing devices in a peer-to-peer fashion. For example, distributed computing device 1310b shares its sampled preference data 1330b with both distributed computing device 1310a and distributed computing device 1310N, and receives the sampled preference data 1330a and 1330N from distributed computing devices 1310a and 1310N, respectively. The distributed computing devices 1310 form various sets of connections, as described with respect to FIGS. 4A and 4B, and exchange and average the sampled preference data until the distributed computing devices 1310 reach a consensus result according to the DAC algorithm, as described with respect to FIGS. 4A-5B.

While the sampled preference data 1330 of one of the distributed computing devices 1310 is shared with the other distributed computing devices 1310, the raw user preference data 1315 does not leave any one of the distributed computing devices 1310. Randomly sampling the user preference data 1315 to generate the sampled preference data 1330 that is shared with other distributed computing devices 1310 obscures the underlying user preference data 1315, so that user privacy is maintained. For example, when distributed computing device 1310a receives the sampled preference data 1330b from another distributed computing device 1310b, the distributed computing device 1310a cannot recover the raw, underlying user preference data 1315b from the sampled preference data 1330b.

The distributed computing devices 1310a-1310N run a consensus algorithm, such as the distributed average consensus (DAC) algorithm described above, on the exchanged sampled preference data 1330 to obtain a consensus result for the sampled preference data. The distributed computing devices 1310a-1310N may also use a convergence indicator, such as the convergence indicator described above with respect to FIGS. 5A and 5B, to determine when a consensus result for the sampled preference data has been reached by all of the distributed computing devices 1310a-1310N. For example, the devices 1310a-1310N perform the DAC process on the matrices of sampled preference data 1330 to obtain a global matrix of the same size as the matrices of sampled preference data 1330. When the convergence indicator indicates that a distributed average consensus for the sampled preference data matrices has been achieved (i.e., that the exchanged and averaged sampled preference data matrices have converged), each recommendation module 1320 generates its own recommendation model from the consensus result. The recommendation model may vary slightly between distributed computing devices 1310, e.g., within the margin of error tolerance permitted for consensus.

The recommendation module 1320 then applies the recommendation model to the local user preference data 1315 to generate recommendations for the user of the distributed computing device 1310.

As described above, using the DAC algorithm in conjunction with the convergence indicator to generate the recommendation model ensures that each distributed computing device 1310 has contributed to the coordinated recommendation modeling effort undertaken by the distributed computing devices 1310a-1310N. Unlike prior recommendation modeling processes, processes for generating the recommendation model according to embodiments herein run without the need for a central server. In addition, sampling the user preference data 1315 and performing the DAC algorithm reduces the computational resources required for each device 1310. The amount of user preference data 1315, or sampled preference data 1330, generated by all distributed computing devices 1310 can be large. While a single sampled user preference matrix can be stored on a single distributed computing device 1310, if the number of distributed computing devices N is large, a single distributed computing device 1310 may not be able to store all of the sampled preference data generated by the N devices, or even a portion of the N devices. In performing the DAC process, the distributed computing devices 1310 exchange and manipulate matrices of the size of the matrix of sampled preference data 1330 to generate a global matrix of the same size as the matrix of sampled preference data 1330. At no point during the DAC process does a distributed computing device 1310 store close to the amount of preference data or sampled preference data generated by all N devices.

As an example, $A_i \in \mathbb{R}^N$ represents a vector of user preference data that is local to node i for $i=\{1, \ldots, N_{nodes}\}$, and $A=[A_1, \ldots, A_{N_{nodes}}] \in \mathbb{R}^{N \times N_{nodes}}$ represents the global data set of all user preference data 1315. The cooperative subspace approach computes, in a fully distributed fashion, a representative subspace, $U \in \mathbb{R}^{N \times q}$, which approximates the range of A such that $\|A-UU^T A\| \leq \epsilon \|A\|$, where $\epsilon$ is a user specified tolerance on the accuracy of the approximation between 0 and 1. As noted above, in other embodiments, user preference data can be arranged in a matrix rather than a vector.

Figure 14:
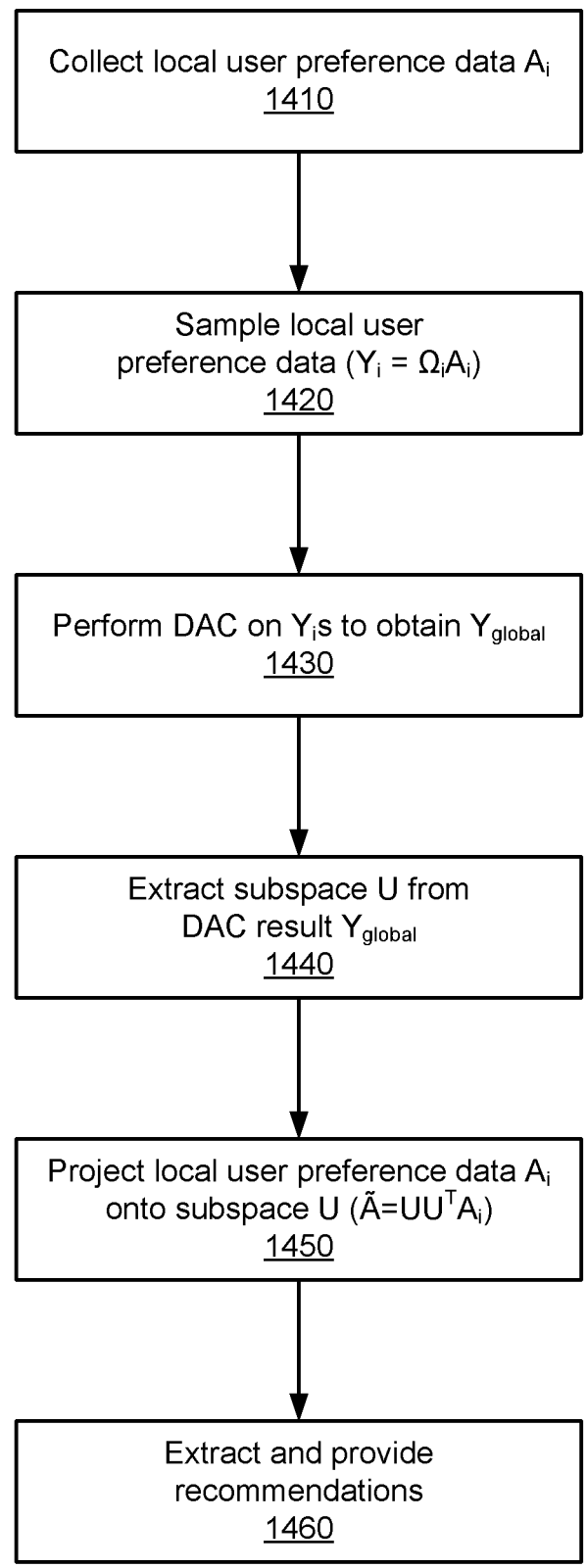
FIG. 14 is a flowchart showing a method for generating a personalized recommendation using a cooperative subspace algorithm, according to one embodiment.

FIG. 14 is a flowchart showing a method for generating a personalized recommendation using a cooperative subspace algorithm at a particular node i, e.g., one of the distributed computing devices 1310. The distributed computing device 1310 collects 1410 local user preference data $A_i$, e.g., the distributed computing device 1310a collects user preference data 1315a. As described above, the distributed computing device 1310 may receive explicit user preference data as user inputs, e.g., ratings or reviews, or the distributed computing device 1310 may determine user preference data 1315 based on monitoring user activity.

The recommendation module 1320 samples 1420 the local user preference data $A_i$. For example, the recommendation module 1320 generates a random vector $\Omega_i \in \mathbb{R}^q$ and multiplies the random vector $\Omega_i$ by the local data $A_i$. The random vector $\Omega_i$ is a vector of random values, e.g., a Gaussian ensemble. Each distributed computing device 1310 generates the random vector $\Omega_i$ independently. The recommendation module 1320 multiplies its local data vector $A_i$ and the random vector $\Omega_i$ to generate the outer product $Y_i = A_i \Omega_i \in \mathbb{R}^{N \times q}$. The matrix $Y_i$ is an example of the sampled preference data 1330, and Y approximates the data in the local data vector $A_i$ (i.e., $Y_i$ approximates the user preference data 1315).

The recommendation module 1320 of the distributed computing device 1310, in cooperation with the other distributed computing devices, performs 1430 the DAC algorithm on the sampled preference data matrices $Y_i$ to obtain a global DAC result $Y_{global}$, which is the global matrix representing a consensus result for the matrices of sampled preference data 1330. $Y_{global}$ can be represented as follows:

$$Y_{Global} = \frac{1}{N_{nodes}} A [\Omega_1^T, \ldots, \Omega_{N_{nodes}}^T]^T \in \mathbb{R}^{N \times q} \quad (13)$$

During a first iteration of DAC process, a distributed computing device 1310 exchanges its sampled preference data matrix $Y_i$ with another distributed computing device 1310. For example, distributed computing device 1310a transmits the sampled preference data 1330a to the distributed computing device 1310b, and receives sampled preference data 1330b from distributed computing device 1310b. The recommendation module 1320 calculates an average of its sampled preference data matrix $Y_i$ and the sampled data preference matrix received from the other distributed computing device. For example, the recommendation module 1320a calculates an average of its sampled preference data 1330a and the received sampled preference data 1330b. This results in consensus sampled user preference data, which is a matrix of the same size as the sampled preference data matrix $Y_i$. In subsequent iterations, distributed computing devices 1310 exchange and average their current consensus sampled user preference data. The consensus sampled user preference data is repeatedly exchanged and averaged until a consensus result across the distributed computing devices 1310 is reached. The consensus result, which is the matrix $Y_{global}$, is obtained when the consensus sampled user preference data is substantially the same across all the distributed computing devices 1310, e.g., within a specified margin of error. The convergence indicator described with respect to FIGS. 5A and 5B may be used to determine when the consensus result $Y_{global}$ has been reached, and to determine whether all distributed computing devices 1310 participated in determining the consensus result.

While the full global data set of all user preference data $A_{global}$ including the preference data from each distributed computing device 1310 may be too large to be stored on and manipulated by a single distributed computing device 1310, the sampled preference data matrices $Y_i$, and therefore the consensus sampled preference data matrices and the global consensus $Y_{global}$, are sufficiently small to be stored on and manipulated by a single distributed computing device 1310.

After calculating the DAC result $Y_{global}$, the recommendation module 1320 extracts 1440 a subspace matrix U that spans the range of $Y_{global}$. For example, the recommendation module 1320 performs a local unitary decomposition, i.e., $Y_{Global} = UR$ to obtain U or performs another form of orthogonal decomposition. Following the decomposition, the distributed computing device 1310 (and each other cooperating distributed computing device) holds a copy of the representative subspace, $U \in \mathbb{R}^{N \times q}$ which approximately spans the range of the global preference data matrix $A_{global}$. The representative subspace U is a recommendation model that the recommendation module 1320 can apply to an individual user's user preference data 1315 to determine recommendations for the user.

The recommendation module 1320 projects 1450 the local user preference data $A_i$ onto the subspace U to obtain a recommendation vector $\tilde{A} = UU^T A_i$. Each element of the recommendation vector $\tilde{A}$ corresponds to an element in the user preference vector $A_i$. For example, if the user preference vector $A_i$ indicates user preferences for each of a set of movies, the recommendation vector $\tilde{A}$ indicates potential user interest in each of the same set of movies. The value for a given element of the recommendation vector $\tilde{A}$ represents a predicted preference of the user for the item represented by the element. As an example, if the local preference data $A_i$ represents a set of movies, the value of the first element of the recommendation vector $\tilde{A}$ corresponds to the user's predicted preference for or interest in the movie "The A-Team."

The recommendation module 1320 extracts and provides 1460 recommendations based on the recommendation vector $\tilde{A}$ to the user of the distributed computing device 1310. For example, the recommendation module 1320 identifies the items in the set corresponding to the elements in the recommendation vector $\tilde{A}$ having the highest values, and provides these items to the user as recommendations. In the movie example, the recommendation module 1320 may identify ten movies with the highest values in the recommendation vector $\tilde{A}$ and for which the user has not provided preference data in the user preference data 1315, and return these movies as recommendations.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for generating personalized recommendations comprising:
    storing, at a distributed computing device, user preference data representing preferences of a user with respect to a portion of a set of items;
    sampling the user preference data;
    determining a consensus result for the sampled user preference data, the consensus result based on the sampled user preference data calculated by the distributed computing device and additional sampled user preference data calculated by a plurality of additional distributed computing devices connected to the distributed computing device by a network, the additional sampled user preference data based on preferences of a plurality of additional users;
    determining, by the distributed computing device, a recommendation model based on the consensus result for the sampled user preference data, the recommendation model reflecting the preferences of the user and the plurality of additional users; and
    providing, by the distributed computing device, the recommendation of an item of the set of items to the user, the item identified based on the recommendation model.

2. The method of claim 1, wherein the user preference data is a user preference vector, wherein each element in the user preference vector corresponds to an item of the set of items, and wherein sampling the user preference data comprises calculating a sampled user preference matrix by multiplying a random matrix and the user preference vector.

3. The method of claim 2, wherein the consensus result is a global consensus matrix of a same dimensionality as the sampled user preference matrix, and wherein determining the recommendation model based on the consensus result for the sampled user preference data comprises extracting the recommendation model from the global consensus matrix using orthogonal decomposition.

4. The method of claim 3, wherein the item is identified based on the recommendation model by:
    projecting the user preference vector onto the extracted recommendation model to obtain a personalized recommendation vector; and
    identifying the item of the set of items to provide to the user as the recommendation based on a value of an element in the personalized recommendation vector corresponding to the item.

5. The method of claim 1, wherein determining the consensus result for the sampled user preference data comprises iteratively executing a process to determine the consensus result, and wherein, a first iteration of the process comprises:
    transmitting, over the network, the sampled user preference data of the distributed computing device to a second distributed computing device of the plurality of additional distributed computing devices;
    receiving, over the network, second sampled user preference data generated by the second distributed computing device from the second distributed computing device; and
    calculating consensus sampled user preference data by computing an average of the sampled user preference data and the second sampled user preference data.

6. The method of claim 5, wherein iteratively executing the process to determine the consensus result comprises, for a second iteration of the process:
    transmitting, over the network, the consensus sampled user preference data of the distributed computing device to a third distributed computing device of the plurality of additional distributed computing devices;
    receiving, over the network, an additional consensus sampled user preference data generated by the third distributed computing device from the third distributed computing device; and
    updating the consensus sampled user preference data by computing an average of the consensus sampled user preference data and the additional consensus sampled user preference data.

7. The method of claim 6, wherein, after a plurality of iterations, the consensus sampled user preference data calculated by the distributed computing device substantially converges with consensus sampled user preference data calculated by each of remaining ones of the plurality of additional computing devices, and the consensus sampled user preference data calculated by the distributed computing device is the consensus result.

8. The method of claim 5, wherein sampling the user preference data obscures the user preference data, such that the second distributed computing device cannot recover the user preference data from the sampled user preference data.

9. The method of claim 1, wherein determining the consensus result for the sampled user preference data comprises iteratively executing a process to determine the consensus result, and wherein iteratively executing the process to determine the consensus result comprises, for each iteration of the process:
    transmitting, over the network, a first convergence indicator of the distributed computing device to a second distributed computing device of the plurality of additional distributed computing devices;
    receiving, over the network, a second convergence indicator of the second distributed computing device from the second distributed computing device;
    updating the first convergence indicator of the distributed computing device by determining a center of mass of the first convergence indicator and the second convergence indicator; and
    determining whether the consensus result has been obtained based on the updated first convergence indicator.

10. The method of claim 9, wherein determining whether the consensus result has been obtained based on the updated first convergence indicator comprises determining that the first convergence indicator of the distributed computing device is within a threshold distance of a global center of mass of the first convergence indicator.

11. A non-transitory computer readable storage medium comprising memory with instructions encoded thereon, the instructions, when executed, causing one or more processors to perform operations, the instructions comprising instructions to:
store, at a distributed computing device, user preference data representing preferences of a user with respect to a portion of a set of items;
sample the user preference data;
determine a consensus result for the sampled user preference data, the consensus result based on the sampled user preference data calculated by the distributed computing device and additional sampled user preference data calculated by a plurality of additional distributed computing devices connected to the distributed computing device by a network, the additional sampled user preference data based on preferences of a plurality of additional users;
determine, by the distributed computing device, a recommendation model based on the consensus result for the sampled user preference data, the recommendation model reflecting the preferences of the user and the plurality of additional users; and
provide, by the distributed computing device, the recommendation of an item of the set of items to the user, the item identified based on the recommendation model.

12. The non-transitory computer-readable medium of claim 11, wherein the user preference data is a user preference vector, wherein each element in the user preference vector corresponds to an item of the set of items, and wherein the instructions to sample the user preference data comprise instructions to calculating a sampled user preference matrix by multiplying a random matrix and the user preference vector.

13. The non-transitory computer-readable medium of claim 12, wherein the consensus result is a global consensus matrix of a same dimensionality as the sampled user preference matrix, and wherein the instructions to determine the recommendation model based on the consensus result for the sampled user preference data comprise instructions to extract the recommendation model from the global consensus matrix using orthogonal decomposition.

14. The non-transitory computer-readable medium of claim 13, wherein the item is identified based on the recommendation model by:
projecting the user preference vector onto the extracted recommendation model to obtain a personalized recommendation vector; and
identifying the item of the set of items to provide to the user as the recommendation based on a value of an element in the personalized recommendation vector corresponding to the item.

15. The non-transitory computer-readable medium of claim 11, wherein the instructions to determine the consensus result for the sampled user preference data comprise instructions to iteratively execute a process to determine the consensus result, and wherein, a first iteration of the process comprises:
transmitting, over the network, the sampled user preference data of the distributed computing device to a second distributed computing device of the plurality of additional distributed computing devices;
receiving, over the network, second sampled user preference data generated by the second distributed computing device from the second distributed computing device; and
calculating consensus sampled user preference data by computing an average of the sampled user preference data and the second sampled user preference data.

16. The non-transitory computer-readable medium of claim 15, wherein the instructions to iteratively execute the process to determine the consensus result comprise instructions to, for a second iteration of the process:
transmit, over the network, the consensus sampled user preference data of the distributed computing device to a third distributed computing device of the plurality of additional distributed computing devices;
receive, over the network, an additional consensus sampled user preference data generated by the third distributed computing device from the third distributed computing device; and
update the consensus sampled user preference data by computing an average of the consensus sampled user preference data and the additional consensus sampled user preference data.

17. The non-transitory computer-readable medium of claim 16, wherein, after a plurality of iterations, the consensus sampled user preference data calculated by the distributed computing device substantially converges with consensus sampled user preference data calculated by each of remaining ones of the plurality of additional computing devices, and the consensus sampled user preference data calculated by the distributed computing device is the consensus result.

18. The non-transitory computer-readable medium of claim 15, wherein the sampling of the user preference data obscures the user preference data, such that the second distributed computing device cannot recover the user preference data from the sampled user preference data.

19. The non-transitory computer-readable medium of claim 11, wherein the instructions to determine the consensus result for the sampled user preference data comprise instructions to iteratively execute a process to determine the consensus result, and wherein iteratively executing the process to determine the consensus result comprises, for each iteration of the process:
transmitting, over the network, a first convergence indicator of the distributed computing device to a second distributed computing device of the plurality of additional distributed computing devices;
receiving, over the network, a second convergence indicator of the second distributed computing device from the second distributed computing device;
updating the first convergence indicator of the distributed computing device by determining a center of mass of the first convergence indicator and the second convergence indicator; and
determining whether the consensus result has been obtained based on the updated first convergence indicator.

20. The non-transitory computer-readable medium of claim 19, wherein the instructions to determine whether the consensus result has been obtained based on the updated first convergence indicator comprise instructions to determine that the first convergence indicator is within a threshold distance of a global center of mass of the first convergence indicator.

* * * * *